United States Patent Office 3,437,900
Patented Apr. 8, 1969

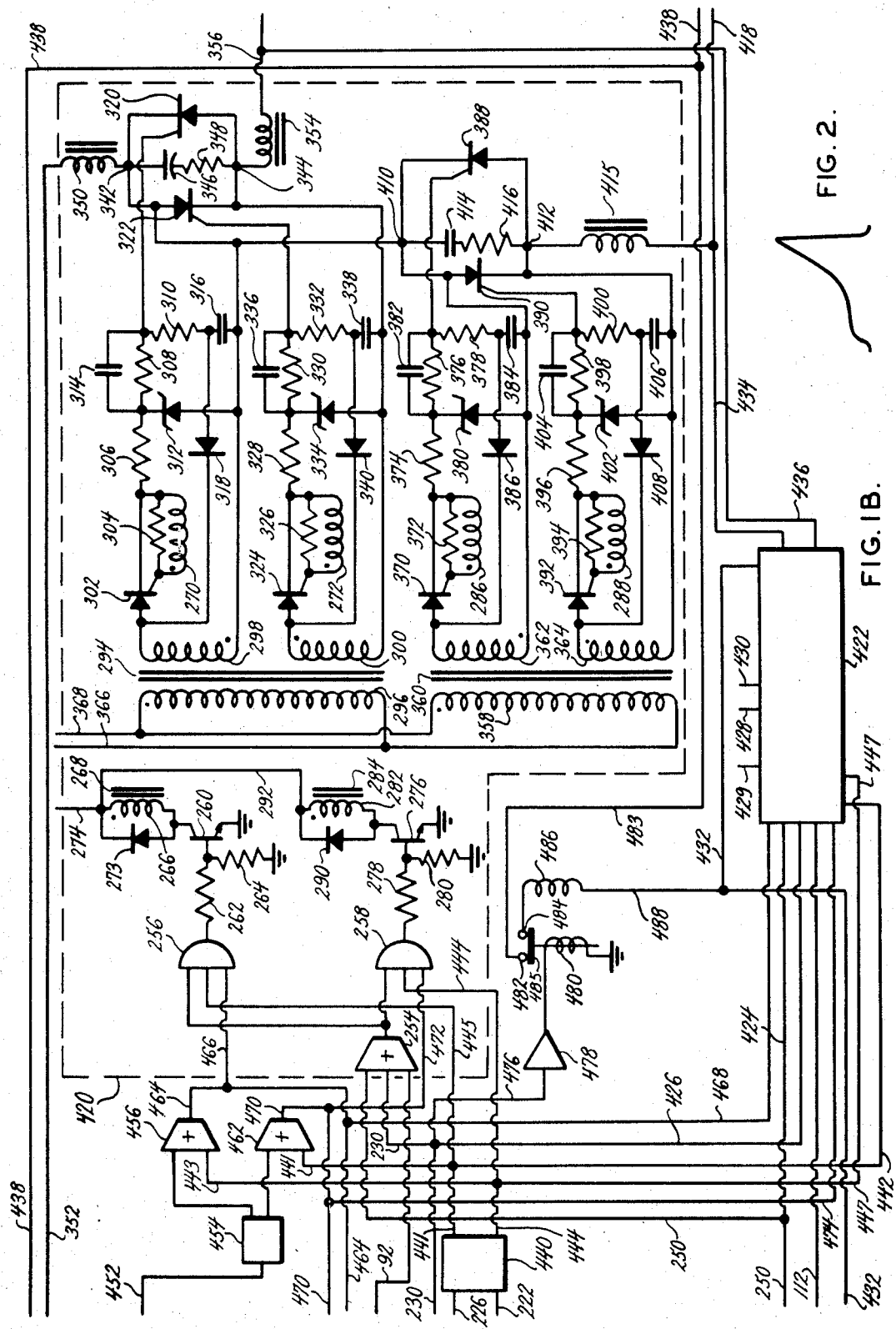

3,437,900
STATIC CONTROL SYSTEM FOR ALTERNATING CURRENT MOTOR EMPLOYING ANALOG TO DIGITAL CONVERTER
Melvin D. Kennedy, St. Louis, Mo., assignor to U.M.C. Industries, Inc., St. Louis, Mo., a corporation of Delaware
Filed Feb 13, 1967, Ser. No. 615,412
Int. Cl. H03k 13/02
U.S. Cl. 318—207                           26 Claims

ABSTRACT OF THE DISCLOSURE

An analog signal, which represents the desired speed and direction of rotation of the rotor of an alternating current motor, is converted to a digital signal that is used to control the speed and direction of rotation of the rotor of that motor.

---

Figure 1A:
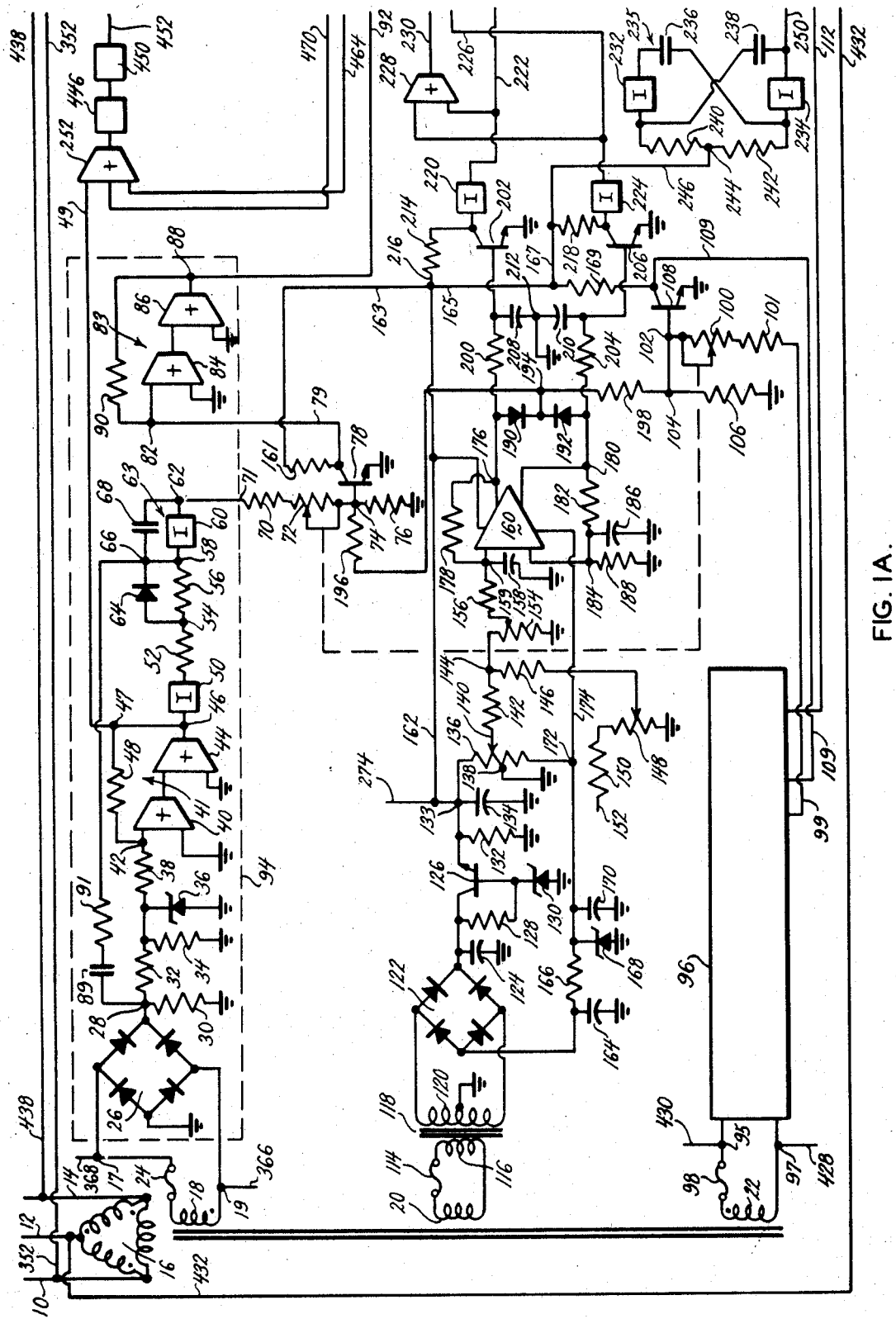

This invention relates to improvements in control systems. More particularly, this invention relates to improvements in control systems which can control the speeds of the rotors of alternating current motors.

It is, therefore, an object of the present invention to provide an improved control system that can control the speed of the rotor of an alternating current motor.

Many control systems for controlling the speeds of the rotors of alternating current motors have been proposed. However, many of those control systems were sensitive to variations in line voltage, and hence were unable to provide sufficiently precise control of the speeds of the rotors of those motors. Other of those control systems have been subject to drift, and hence have been unable to provide sufficiently precise control of the speeds of the rotors of those motors. Still other of those control systems have relied upon expensive and complicated circuits. It would be desirable to provide a control system for controlling the speed of the rotor of an alternating current motor which was substantially insensitive to variations in line voltage, which was substantially free from drift, and which utilized a relatively inexpensive circuit. The present invention provides such a control system; and it is, therefore, an object of the present invention to provide a control system for controlling the speed of rotation of the rotor of an alternating current motor which is substantially insensitive to variations in line voltage, which is substantially free from drift, and which utilizes a relatively inexpensive circuit.

The control system provided by the present invention uses controlled rectifiers to control the amount of power that is supplied to an alternating current motor; and it varies the firing angles of those controlled rectifiers in accordance with a signal that represents the desired speed and direction of rotation of the rotor of that motor. That signal is an analog signal, and that signal is converted to a digital signal which is used to vary the firing angles of the controlled rectifiers. That digital signal is desirable; because it is substantially insensitive to line voltage variations, it is substantially free from drift, and it can actuate relatively inexpensive circuit components. As a result, the control system provided by the present invention can provide precise control of the speed of the rotor of an alternating current motor and yet can be made from relatively inexpensive circuit components. It is, therefore, an object of the present invention to provide a control system that converts an analog signal, which represents the desired speed and direction of rotation of the rotor of an alternating current motor, to a digital signal and then uses that digital signal to control the speed and direction of rotation of that rotor.

Other and further objects and advantages of the present invention should become apparent from an examination of the drawing and accompanying description.

In the drawing and accompanying description a preferred embodiment of the present invention is shown and described, but it is to be understood that the drawing and accompanying description are for the purpose of illustration only and do not limit the invention and that the invention will be defined by the appended claims.

Figure 4:
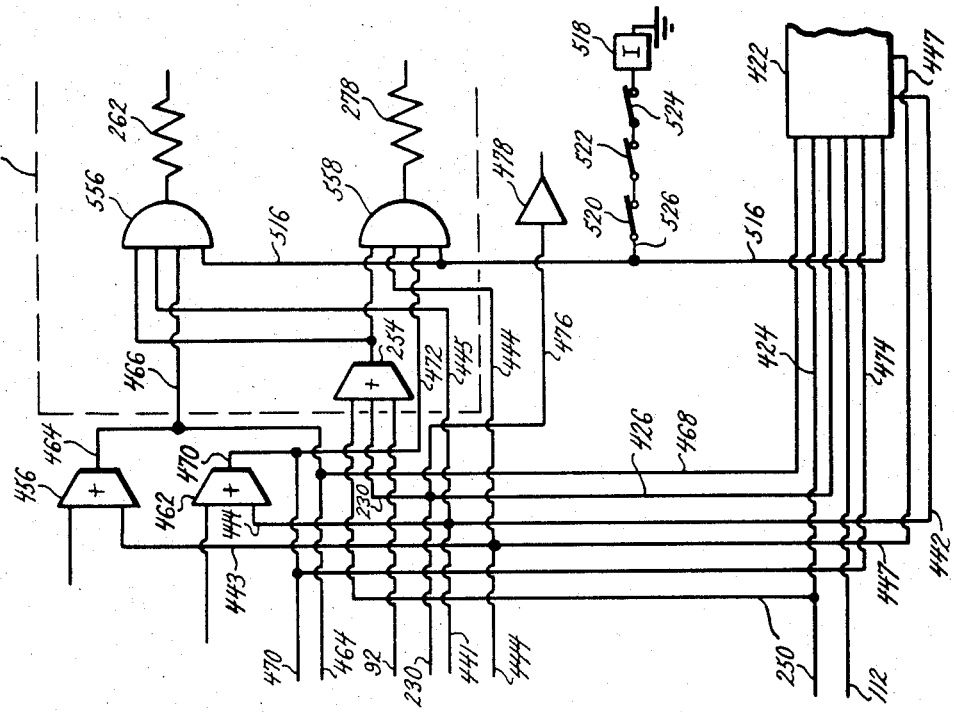
Figure 3:
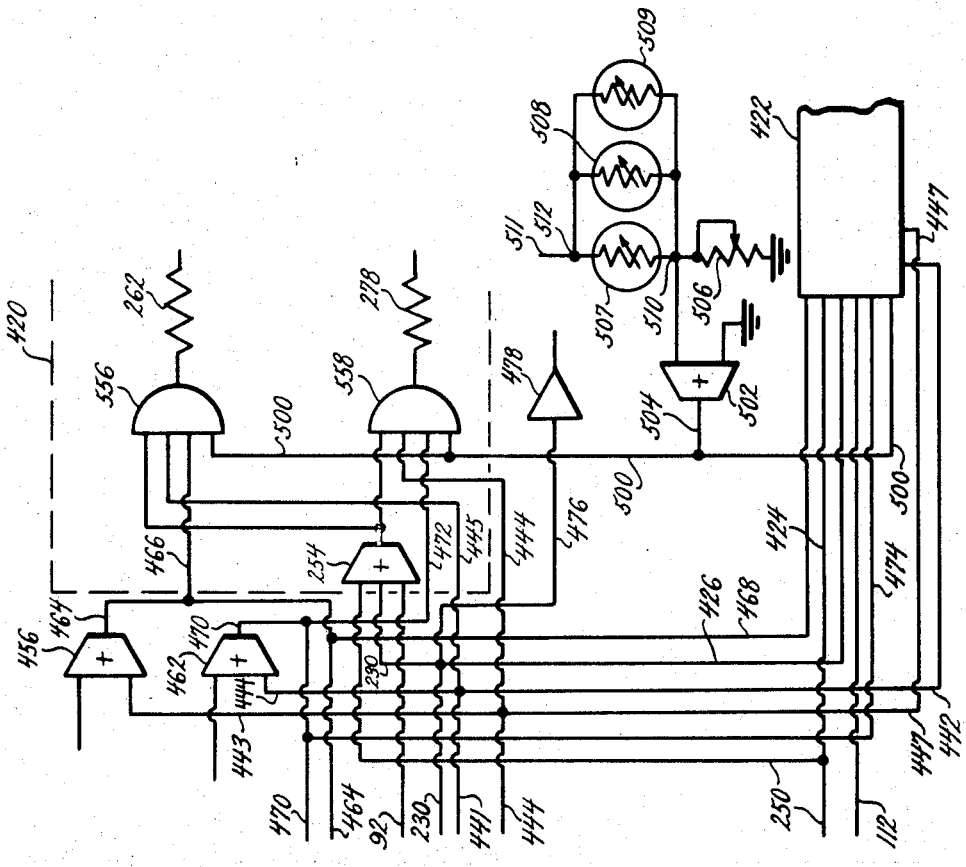

In the drawing, FIG. 1A is one part of a schematic diagram which shows one preferred embodiment of control system, FIG. 1B is the other part of that schematic diagram, FIG. 2 is a representation of a modified sawtooth waveform generated by the control system of FIGS. 1A and 1B, FIG. 3 is a sub-circuit that can be incorporated into FIG. 1B, and FIG. 4 is a further sub-circuit that can be incorporated into FIG. 1B.

Components of control system

Referring to the drawing in detail, the numerals 10, 12 and 14 denote conductors which can be connected to a suitable source of three phase, sixty cycle, four hundred and forty volt A.C. Those conductors extend to the primary winding 16 of a three phase transformer which has a secondary winding 18, a secondary winding 20, and a secondary winding 22. Each of the secondary windings 18, 20 and 22 will develop an A.C. voltage of about one hundred and fifteen volts across it. While the primary winding 16 of the transformer is shown as being delta-connected, it could be Y-connected.

A fuse 24 and a junction 17 connect the upper terminal of the secondary winding 18 to one of the input terminals of a full wave bridge rectifier 26; and a junction 19 connects the lower terminal of that secondary winding to the other input terminal of that full wave bridge rectifier. One of the output terminals of that full wave bridge rectifier is connected to ground; and the other output terminal of that full wave bridge rectifier is connected to the upper input terminal of a Nor gate 40 by a junction 28, a resistor 32, a resistor 38, and a junction 42. A resistor 30 is connected between the junction 28 and ground to "load" the full wave rectifier bridge 26, and thereby cause the current to drop to zero at the end of each half-cycle of the alternating current supplied to the input terminals of that full wave bridge rectifier. A resistor 34 is connected between the resistor 32 and ground; and that resistor will coact with the resistor 32 to constitute a voltage divider which will tend to develop a voltage across the resistor 34 that is slightly greater than the Zener voltage of a Zener diode 36 which is connected in parallel with the resistor 34. That Zener diode will become conductive during each half-cycle of the alternating current supplied to the input terminals of the full wave bridge rectifier 26, and it will act as a clipper to provide "flat top" configurations for the rectified waveforms developed by the full wave bridge rectifier 26.

The lower input terminal of the Nor gate 40 is connected to ground; and the output terminal of the Nor gate 40 is connected to the upper input terminal of a Nor gate 44. The lower input terminal of the Nor gate 44 is connected to ground; and a junction 46, a junction 47, a resistor 48, and the junction 42 connect the output terminal of the Nor gate 44 to the upper input terminal of the Nor gate 40. The resistor 48 coacts with the Nor gates 40 and 44 to constitute a Schmitt trigger 41.

A conductor 49 extends from the junctions 46 and 47 to the upper input terminal of a Nor gate 252 in FIG. 1A. An inverter 50, a resistor 52, a junction 54, a resistor 56, and a junction 58 connect the output of the Schmitt trigger 41 to the input of an integrator 63 which includes an inverter 60 and a capacitor 68. Junctions 62 and 66 coact with the junction 58 to connect the capacitor 68 in parallel with the inverter 60. The junctions 54, 66 and 58 connect a diode 64 in parallel with the resistor 56. A conductor 71, a resistor 70, an adjustable resistor 72, and a junction 74 connect the output of the integrator 63 to the base of an NPN transistor 78. The emitter of that transistor is grounded; but a resistor 76 is connected between the base of that transistor and ground.

A conductor 79 connects the collector of the transistor 78 to the input of a Schmitt trigger 83 which includes a Nor gate 84, a Nor gate 86, junctions 82 and 88, and a resistor 90. The output of that Schmitt trigger is connected to the bottom input terminal of a Nor gate 254 in FIG. 1B by a conductor 92.

A capacitor 89 and a resistor 91 are connected in series between the junction 28 and the input of the integrator 63. That capacitor and resistor will apply the full wave rectified waveform, at the output of the full wave bridge rectifier 26, to the input of that integrator.

The full wave bridge rectifier 26, the Schmitt trigger 41, the inverter 50, the integrator 63, the capacitor 89, the diode 64, the Zener diode 36, the resistors 30, 32, 34, 38, 52, 56, and 91, and the junctions associated therewith constitute a wave-forming and wave-shaping sub-circuit. That wave-forming and wave-shaping sub-circuit and the Schmitt trigger 83 are enclosed within a block 94. The numeral 96 denotes a further block which is identical to the block 94. Specifically, the block 96 has a full wave bridge rectifier corresponding to the full wave bridge rectifier 26, a Schmitt trigger corresponding to the Schmitt trigger 41, an inverter corresponding to the inverter 50, an integrator corresponding to the integrator 63, a capacitor corresponding to the capacitor 89, a diode corresponding to the diode 64, a Zener diode corresponding to the Zener diode 36, resistors corresponding to the resistors 30, 32, 34, 38, 52, 56 and 91, and a Schmitt trigger corresponding to the Schmitt trigger 83. A fuse 98 and a junction 95 connect the upper terminal of the secondary winding 22 to the upper input terminal of the full wave bridge rectifier of the block 96, and a junction 97 connects the lower terminal of that secondary winding to the lower input terminal of that full wave bridge rectifier.

A conductor 99, a resistor 101, an adjustable resistor 100, and a junction 102 connect the output of the integrator in the block 96 to the base of an NPN transistor 108. The emitter of that transistor is grounded; but a resistor 106 is connected between the base of that transistor and ground by the junction 102 and a junction 104. A conductor 109 connects the collector of the transistor 108 to the input of the Schmitt trigger in the block 96 which corresponds to the Schmitt trigger 83. A conductor 112 connects the output of the Schmitt trigger in the block 96, which corresponds to the Schmitt trigger 83, to the bottom input terminal of a Nor gate in a block 422 in FIG. 1B which corresponds to the Nor gate 254 in a block 420 in FIG. 1B.

A fuse 114 connects the upper terminal of the secondary winding 20 to the upper terminal of the primary winding 116 of a transformer 118; and the lower terminal of that secondary winding is directly connected to the lower terminal of that primary winding. The secondary winding 120 of the transformer 118 has a center tap which is connected to ground. The primary winding 116 has about one hundred and fifteen volts applied to it, and the secondary winding 120 will develop fifteen volts across it.

The input terminals of a full wave bridge rectifier 122 are connected to the upper and lower terminals of the secondary winding 120; and one of the output terminals of that full wave bridge rectifier is connected to the collector of an NPN transistor 126. A capacitor 124 is connected between that one output terminal and ground; and a resistor 128 and a Zener diode 130 are connected in series between that one output terminal and ground. The cathode of that Zener diode is connected to the base of the transistor 126; and the emitter of that transistor is connected to a junction 133. That junction is connected to ground by a resistor 132, and a capacitor 134 is connected in parallel with that resistor. The other output terminal of the full wave bridge rectifier 122 is connected to a junction 172 by a resistor 166. A capacitor 164 is connected between that other output terminal and ground; and a Zener diode 168 is connected between the right-hand terminal of the resistor 166 and ground. A capacitor 170 is connected in parallel with that Zener diode. The full wave bridge rectifier 122, the capacitors 124, 134, 164 and 170, the transistor 126, the Zener diodes 130 and 168, and the resistors 128, 132 and 166 constitute an inexpensive source of filtered and regulated D.C. voltage. In the said one preferred embodiment of control system provided by the present invention, a positive four volts will appear at the junction 133, and a negative four volts will appear at the junction 172.

A potentiometer 136 has the upper and lower terminals thereof connected to the junctions 133 and 172; and that potentiometer has a center tap 138 which is connected to ground. That potentiometer also has a movable contact 140 which can be set to provide different values of positive voltage, to provide zero voltage, or to provide different values of negative voltage at the left-hand terminal of a resistor 142. The right-hand terminal of that resistor is connected to a junction 144; and a conductor 152, a resistor 150, the upper section and movable contact of a potentiometer 148, and a resistor 146 connect a speed and direction sensing means such as a tachometer to that junction. The lower terminal of the potentiometer 148 is connected to ground. The junction 144 is connected to ground by a potentiometer 154; and the upper section and movable contact of that potentiometer, a resistor 156, and a junction 159 connect the junction 144 to the upper input terminal of an error amplifier 160. A capacitor 158 is connected between the junction 159 and ground. In the said one preferred embodiment of control system, the error amplifier is an integrated circuit, differential amplifier; and that amplifier provides a positive single-ended output and a negative single-ended output which are drift free.

A conductor 162 supplies positive voltage to the error amplifier 160, and a conductor 174 supplies negative voltage to that error amplifier. The lower input terminal of that error amplifier is connected to ground by a junction 184 and parallel-connected resistor 188 and capacitor 186. The upper output terminal of the error amplifier 160 is connected to the upper input terminal of that error amplifier by a junction 176, a resistor 178, and the junction 159. The lower output terminal of that error amplifier is connected to the lower input terminal of that error amplifier by a junction 180, a resistor 182, and the junction 184.

A diode 190 and a diode 192 have the cathodes thereof connected together and to a junction 194; and the diode 190 has the anode thereof connected to the upper output terminal of the error amplifier 160 by the junction 176, while the diode 192 has the anode thereof connected to the lower output terminal of that error amplifier by the junction 180. A resistor 196 connects the junction 194 to the junction 74, and thus to the base of the transistor 78. A resistor 161, a conductor 163, and the conductor 162 connect the collector of that transistor to the junction 133, and thus to four volts positive. A resistor 198 and the junctions 104 and 102 connect the junction 194 to the base of the transistor 108. A resistor 169, a conductor 165, and the conductor 162 connect the collector of that transistor to the junction 133, and thus to four volts positive.

A resistor 200 and the junction 176 connect the upper output terminal of the error amplifier 160 to the base of an NPN transistor 202. That transistor has the emitter thereof grounded; and a resistor 214, a conductor 216, and the conductor 162 connect the collector of that transistor to the junction 133, and thus to four volts positive. A resistor 204 and the junction 180 connect the lower output terminal of the error amplifier 160 to the base of an NPN transistor 206. The emitter of that transistor is grounded; and a resistor 218, a conductor 167, and the conductors 165 and 162 connect the collector of that transistor to the junction 133, and thus to four volts positive. Capacitors 208 and 210 have the confronting terminals thereof connected together and to ground by a junction 212; and the other terminal of the capacitor 208 is connected to the right-hand terminal of the resistor 200, while the other terminal of the capacitor 210 is connected to the right-hand terminal of the resistor 204.

An inverter 220 and a conductor 222 connect the collector of the transistor 202 to the lower input terminal of a flip-flop 440 in FIG. 1B. While different flip-flops could be used, a J-K binary element that is connected to operate as a "reset-set" flip-flop has been found to be very useful. That flip-flop will respond to the application of a positive voltage to the upper input terminal thereof to develop a positive voltage at the upper output terminal thereof and an essentially zero voltage at the lower output terminal thereof; and it will maintain those voltages at those output terminals until a positive voltage is applied to the lower input terminal thereof. Upon the application of such a voltage to that input terminal, that flip-flop will develop a positive voltage at the lower output terminal thereof and an essentially zero voltage at the upper output terminal; and it will maintain those voltages at those output terminals until a positive voltage is again applied to the upper input terminal thereof. An inverter 224 and a conductor 226 connect the collector of the transistor 206 to the upper input terminal of the flip-flop 440. The inverter 220 also connects the collector of the transistor 202 to the lower input terminal of a Nor gate 228; and the inverter 224 connects the collector of the transistor 206 to the upper input terminal of that Nor gate. A conductor 230 connects the output terminal of that Nor gate to the middle input terminal of the Nor gate 254 in FIG. 1B, and also coacts with a conductor 426 to connect that output terminal to the middle input terminal of the Nor gate in the block 422 which corresponds to the Nor gate 254.

The numeral 235 denotes a free running multivibrator; and, in the said one preferred embodiment of control system provided by the present invention, that multivibrator produces rectangular waves having a frequency of four kilocycles. That multivibrator includes an inverter 232, an inverter 234, capacitors 236 and 238, and resistors 240 and 242. A junction 244 between those resistors is connected to the junction 133, and thus to four volts positive, by a conductor 246 and the conductors 167, 165 and 162. The output of the multivibrator 235 is connected to the upper input terminal of the Nor gate 254 by a conductor 250, and to the upper input terminal of the corresponding Nor gate in the block 422 by the conductor 250 and a conductor 424.

The output of the Nor gate 254 is connected to the upper input terminals of And gates 256 and 258. The middle input terminal of the And gate 256 is connected to the upper output terminal of the flip-flop 440 by a conductor 445 and a conductor 441; and the middle input terminal of the And gate 258 is connected to the lower output terminal of that flip-flop by a conductor 444.

The output terminal of the And gate 256 is connected to the base of an NPN transistor 260 by a resistor 262. A resistor 264 is connected between the base of the transistor 260 and ground; and the emitter of that transistor is grounded. The collector of that transistor is connected to the junction 133 in FIG. 1A, and thus to four volts positive, by the primary winding 266 of a transformer 268 and a conductor 274. A discharge diode 273 is connected in parallel with that primary winding. The output terminal of the And gate 258 is connected to the base of an NPN transistor 276 by a resistor 278. A resistor 280 is connected between the base of that transistor and ground; and the emitter of that transistor is grounded. The collector of that transistor is connected to the terminal 133 in FIG. 1A, and thus to four volts positive, by the primary winding 282 of a transformer 284, a conductor 292, and the conductor 274. A discharge diode 290 is connected in parallel with that primary winding.

The transformer 268 has two secondary windings 270 and 272; and the secondary winding 270 constitutes part of a firing circuit for a controlled rectifier 302, while the secondary winding 272 constitutes part of a firing circuit for a controlled rectifier 324. The controlled rectifiers 302 and 324 preferably are silicon controlled rectifiers. A resistor 304 is connected between the gate and cathode of the controlled rectifier 302 and across the secondary winding 270 and that resistor will respond to voltages developed across that secondary winding to cause sufficient current to flow through the gate-to-cathode circuit of that controlled rectifier to render that controlled rectifier conductive. Similarly, a resistor 326 is connected between the gate and cathode of the controlled rectifier 324 and across the secondary winding 272; and that resistor will respond to voltages developed across that secondary winding to cause sufficient current to flow through the gate-to-cathode circuit of that controlled rectifier to render that controlled rectifier conductive.

The cathode of the controlled rectifier 302 is connected to the gate of a controlled rectifier 320 by a resistor 306 and a resistor 308. The upper terminal of the secondary winding 298 of a transformer 294 is connected to the anode of the controlled rectifier 302, and the lower terminal of that secondary winding is connected to the cathode of the controlled rectifier 320 by a junction 342. A capacitor 314 is connected in parallel with the resistor 308, a resistor 310 and a capacitor 316 are connected in series across the gate-to-cathode circuit of the controlled rectifier 320, a Zener diode 312 is connected between the lower terminal of secondary winding 298 and the right-hand terminal of resistor 306, and a diode 318 extends from the junction between the resistor 310 and the capacitor 316 to the upper terminal of that secondary winding. The cathode of the controlled rectifier 324 is connected to the gate of a controlled rectifier 322 by a resistor 328 and a resistor 330. The secondary winding 300 of the transformer 294 has the upper terminal thereof connected to the anode of the controlled rectifier 324, and has the lower terminal thereof connected to the cathode of the controlled rectifier 322. A capacitor 336 is connected in parallel with the resistor 330, and a Zener diode 334 is connected between the right-hand terminal of the resistor 328 and the lower terminal of the secondary winding 300. A resistor 332 and a capacitor 338 are connected in series across the gate-to-cathode circuit of the controlled rectifier 322; and a diode 340 extends from the junction between that resistor and that capacitor to the upper terminal of the secondary winding 300. The controlled rectifiers 320 and 322 preferably are silicon controlled rectifiers. The primary winding 296 of the transformer 294 has the upper terminal thereof connected to the junction 17 in FIG. 1A by a conductor 368, and has the lower terminal thereof connected to the junction 19 in FIG. 1A by a conductor 366.

The transformer 284 has two secondary windings 286 and 288; and the secondary winding 286 constitutes part of a firing circuit for a controlled rectifier 370, while the secondary winding 288 constitutes part of a firing circuit for a controlled rectifier 392. The controlled rectifiers 370 and 392 preferably are silicon controlled rectifiers. A resistor 372 is connected between the gate and cathode of the controlled rectifier 370 and across the secondary winding 286; and that resistor will respond to voltages across that secondary winding to cause sufficient current to flow through the gate-to-cathode circuit of that controlled rectifier to render that controlled rectifier conductive. Similarly, a resistor 394 is connected between the gate and cathode of the controlled rectifier 392 and across the secondary winding 288; and that resistor will respond to voltages across that secondary winding to cause sufficient current to flow through the gate-to-cathode circuit of that controlled rectifier to render that controlled rectifier conductive.

Resistors 374 and 376 connect the cathode of the controlled rectifier 370 to the gate of a controlled rectifier 388; and the lower terminal of the secondary winding 362 of a transformer 360 is connected to the cathode of the controlled rectifier 388 by a junction 410, while the upper terminal of that secondary winding is connected to the anode of the controlled rectifier 370. A capacitor 382 is connected in parallel with the resistor 376, and a Zener diode 380 is connected between the right-hand terminal of the resistor 374 and the lower terminal of the secondary winding 362. A resistor 378 and a capacitor 384 are connected in series between the gate and cathode of the controlled rectifier 388; and a diode 386 extends from the junction between that resistor and capacitor to the upper terminal of the secondary winding 362. Resistors 396 and 398 connect the cathode of the controlled rectifier 392 to the gate of a controlled rectifier 390; and the lower terminal of the secondary winding 364 of the transformer 360 is connected to the cathode of the controlled rectifier 390 while the upper terminal of that secondary winding is connected to the anode of the controlled rectifier 392. A capacitor 404 is connected in parallel with the resistor 398; and a Zener diode 402 is connected between the right-hand terminal of the resistor 396 and the lower terminal of the secondary winding 364. A resistor 400 and a capacitor 406 are connected between the gate and cathode of the controlled rectifier 390; and a diode 408 extends from the junction between that resistor and capacitor to the upper terminal of the secondary winding 364. The controlled rectifiers 388 and 390 preferably are silicon controlled rectifiers. The primary winding 358 of the transformer 360 has the upper terminal thereof connected to the junction 17 in FIG. 1A by the conductor 368, and has the lower terminal thereof connected to the junction 19 in FIG. 1A by the conductor 366.

The firing circuits of which the controlled rectifiers 302, 324, 370, and 392 are component parts are of standard and usual design. Those firing circuits will respond to the alternating currents supplied to the primary windings 296 and 358 by the secondary winding 18 in FIG. 1A and to firing pulses from the transformers 268 and 284 to render the controlled rectifiers 320, 322, 388 and 390 conductive. It will be noted that the firing circuit for the controlled rectifier 320 is polarized oppositely of the firing circuit for the controlled rectifier 322. Similarly, the firing circuit for the controlled rectifier 388 is polarized oppositely of the firing circuit for the controlled rectifier 390. Consequently, the controlled rectifiers 320 and 388 can be rendered conductive during portions of one-half of the half-cycles of the alternating current in the primary windings 296 and 358, while the controlled rectifiers 322 and 390 can be rendered conductive during portions of the other half-cycles of that alternating current.

The cathode of the controlled rectifier 320 and the anode of the controlled rectifier 322 are connected to the conductor 10 in FIG. 1A by the junction 342, a choke 350 and a conductor 352. The anode of the controlled rectifier 320 and the cathode of the controlled rectifier 322 are connected to a conductor 356 by a junction 344 and a choke 354; and that conductor will be connected to one of the phases of a three phase alternating current motor, not shown. That motor can have the windings thereof connected in delta or in Y, as desired. A capacitor 346 and a resistor 348 are connected in series between the junctions 342 and 344, and thus in parallel with the back-to-back controlled rectifiers 320 and 322. The cathode of the controlled rectifier 388 and the anode of the controlled rectifier 390 are connected to the conductor 10 in FIG. 1A by the junctions 410 and 342, the choke 350, and the conductor 352. The anode of the controlled rectifier 388 and the cathode of the controlled rectifier 390 are connected to a conductor 418 by a junction 412; and a choke 415 and that conductor can be connected to a second phase of the said three phase alternating current motor. A capacitor 414 and a resistor 416 are connected between the junctions 410 and 412, and thus in parallel with the back-to-back controlled rectifiers 388 and 390.

The various components in the block 420 will have exact counterparts in the block 422. The conductor 441 and a conductor 442 connect the upper output terminal of the flip-flop 440 to the middle input terminal of the upper And gate of the block 422; and the conductor 444 and a conductor 447 connect the lower output terminal of that flip-flop to the middle input terminal of the lower And gate in the block 422. A conductor 429 extends from the primary windings of transformers in the block 422, which correspond to the primary windings 266 and 282 in the block 420, to the junction 133 in FIG. 1A. Conductors 428 and 430 extend from the primary windings in the block 422, which correspond to the primary windings 296 and 358 in the block 420, to the junctions 97 and 95, respectively, in FIG. 1A. A conductor 432 extends from the conductor 12 in FIG. 1A to the back-to-back controlled rectifiers in the block 422 which correspond to the back-to-back controlled rectifiers 320 and 322 and which correspond to the back-to-back controlled rectifiers 388 and 390 in block 420. A conductor 434 extends from a choke in the block 422, which corresponds to the choke 354, to the conductor 418 that is connectable to the said second phase of the alternating current motor. A conductor 436 extends from a choke in the block 422, which corresponds to the choke 415, to the conductor 356 that is connectable to the said one phase of the alternating current motor.

The output terminal of the Nor gate 252 in FIG. 1A is connected to the input terminal of a J-K binary 446 which is used as a flip-flop; and the output terminal of that binary is connected to the input terminal of a J-K binary 450 which also is used as a flip-flop. The output terminal of the binary 450 is connected, by means of a conductor 452, to the input terminal of a J-K binary 454 in FIG. 1B which is used as a flip-flop; and the upper output terminal of the binary 454 is connected to the upper input terminal of a Nor gate 456 while the lower output terminal of the binary 454 is connected to the upper input terminal of a Nor gate 462. A conductor 443 coacts with the conductor 444 to connect the lower output terminal of the flip-flop 440 to the lower input terminal of the Nor gate 456. The conductor 441 connects the upper output terminal of the flip-flop 440 to the lower input terminal of the Nor gate 462.

A conductor 464 connects the output terminal of the Nor gate 456 to the lower input terminal of the Nor gate 252, coacts with a conductor 466 to connect that output terminal to the lower input terminal of the And gate 256, and coacts with a conductor 468 to connect that output terminal to the lower input terminal of the And gate in the block 422 which corresponds to the And gate 256. A conductor 470 connects the output terminal of the Nor gate 462 to the middle input terminal of the Nor gate 252, coacts with a conductor 472 to connect that output terminal to the lower input terminal of the And gate 258, and coacts with a conductor 474 to connect that output terminal to the lower input terminal of the And gate in the block 422 which corresponds to the And gate 258. The binaries 446, 450 and 454 will coact to provide a short time delay whenever the control system is actuated to reverse the direction of rotation of the rotor of the alternating current motor.

A conductor 476 and the conductor 230 connect the output terminal of the Nor gate 228 in FIG. 1A to the input of an amplifier 478 in FIG. 1B; and the output of that amplifier is connected to ground through a relay coil 480. A relay contact 482 is connected to a conductor 438 by a conductor 483; and the conductor 438 is connected to the conductor 14 in FIG. 1A and is connectable to the third phase of the three phase alternating current motor, not shown. A relay contact 484 is connected to the conductor 432 by a brake winding 486 and conductor 488; and that relay contact and the relay contact 482 can be bridged by an armature 485 under the control of the relay coil 480. That armature is biased away from the relay contacts 482 and 484, but whenever the relay coil 480 is energized, that armature will bridge those relay contacts 482 and 484 and will directly connect the brake winding 486 across the conductors 12 and 14 in FIG. 1A. If the relay coil 480 is part of a very sensitive relay, the amplifier 478 can be eliminated.

Wave-forming and wave-shaping sub-circuits

The full wave bridge rectifier 26 will receive alternating current from the secondary winding 18 and will convert that alternating current to a full wave rectified wave form. That Zener diode 36 will provide "flat top" configurations for that full wave rectified wave form; and the Schmitt trigger 41 will convert that flat-top full wave rectified wave form into rectangular waves. In the said one preferred embodiment of control system provided by the present invention, each of the rectangular waves will be "off" for one millisecond and will be "on" for seven milliseconds. The one millisecond "off" time will appear as a one-half millisecond period prior to the seven milliseconds "on" time and also as a second one-half millisecond "off" period subsequent to that seven millisecond "on" time. The overall duration of the seven milliseconds "on" time plus the two one-half millisecond "off" periods of each rectangular wave will equal the duration of a half-cycle of the alternating current flowing through the secondary winding 18; and the rectangular waves developed by the Schmitt trigger 41 will be in phase with the half-cycles of that alternating current.

The inverter 50 will change the "on" and "off" times of the rectangular waves developed by the Schmitt trigger 41—making the "off" time seven milliseconds long and making the "on" time one millisecond long. The one millisecond "on" time will appear as a one-half millisecond period prior to the seven milliseconds "off" time and also a second one-half millisecond "on" period subsequent to that seven milliseconds "off" time. The inverter 60 of the integrator 63 will tend to develop, at the output thereof, rectangular waves with configurations similar to those of the rectangular waves at the output of the Schmitt trigger 41; but the capacitor 68 of that integrator will tend to make the waves at the output of that integrator have linear sawtooth configurations, and the capacitor 89 will differentiate the full wave rectified wave forms at the output of the full wave bridge rectifier 26 and will tend to make the waves at the output of that integrator assume a cosine wave form. The overall interaction between the capacitor 89 and the inverter 60 and capacitor 68 of the integrator 63 will produce the modified sawtooth wave form, shown by FIG. 2, at the output of that integrator; and that modified sawtooth wave form will enable the control system of the present invention to vary the firing angles of the controlled rectifiers 320, 322, 388 and 390 in such a manner that linear control of the power supplied to the motor can be provided. That modified sawtooth wave form also will enable that control system to provide stable operation of that motor.

The wave-forming and waveshaping sub-circuit of the block 96 will provide a modified sawtooth wave form which is identical to the modified sawtooth wave form of FIG. 2. That modified sawtooth wave form will enable the control system of the present invention to vary the firing angles of the controlled rectifiers in the block 422, which correspond to the controlled rectifiers 320, 322, 388 and 390, in such a manner that linear control of the power supplied to the motor can be provided. That modified sawtooth wave form also will enable that control system to provide stable operation of that motor.

The diode 64 in the wave-forming and wave-shaping sub-circuit of block 94 will act as a discharge diode for the capacitor 68 of the integrator 63. Specifically, during each "off" period of the integrator 63, current will flow from the right-hand terminal of capacitor 68 via junction 62, the ground connection within the inverter 60 of that integrator, the ground connection within the inverter 50, resistor 52, junction 54, diode 64, and junction 66 to the left-hand terminal of that capacitor.

Adjustment of control system

To adjust the control system of the present invention, the operator should connect the motor to the load to be driven by that motor, should move the movable contact of the potentiometer 148 to its lowermost position, and should then move the movable contact 140 of the potentiometer 136 to its upper most or to its lowermost position. The speed and direction sensing means, such as a tachometer, which is connected to the conductor 152 will respond to any rotation of the rotor of the motor to provide negative feed back to the upper input terminal of the error amplifier 160; and, initially, it will be desirable to isolate any and all feedback provided by that speed and direction sensing means from that upper input terminal—and the movement of the movable contact of the potentiometer 148 to its lowermost position will provide such isolation. The movement of the movable contact 140 of the potentiometer 136 to its uppermost position or its lower most position will, respectively, cause the rotor of the motor to rotate in the clockwise direction or the counter clockwise direction at its maximum speed. After that rotor has reached its maximum speed, the operator should move the movable contact of the potentiometer 148 upwardly, and should thus permit the speed and direction sensing means to supply negative feedback to the upper input terminal of the error amplifier 160. The control system of the present invention will respond to that negative feedback to reduce the speed of the rotor of the motor; and, when that rotor reaches a desired "full speed," the movable contact of potentimometer 148 will be left in that position. The speed of the rotor of the motor can be determined by a tachometer or by measuring the output voltage of that speed and direction sensing means.

At this time, the operator should adjust the position of the movable contact of the potentiometer 154 to set the gain of the error amplifier 160 to the highest value which will not cause the control system to oscillate. Thereafter, that operator should recheck, and if necessary readjust, the setting of the movable contact of the potentiometer 148.

The movable contact 140 of the potentiometer 136 should then be moved to a position close to, but spaced away from, the midpoint of that potentiometer; and that position will subsequently be one of the limits of the "dead band" of that potentiometer. The other limit of that "dead band" will be a position at the opposite side of, and spaced the same distance away from, the mid-point of that potentiometer. For purposes of illustration, it will be assumed that the movable contact 140 of the potentiometer 136 is moved downwardly during the setting of the "dead band" of that potentiometer; and the resulting application of a negative voltage to the upper input terminal of the error amplifier 160 will cause a positive voltage to develop at the upper output terminal of that error amplifier, and will cause a negative voltage to appear at the lower output terminal of that error amplifier. The positive voltage at that upper output terminal will be great enough to render the transistor 202 conductive at the saturation level; but that positive voltage will not, because of the voltage drop across the diode 190, be able to render the transistor 78 or the transistor 108 conductive.

As the transistor 202 becomes conductive, it will cause the voltage at the collector thereof, and hence at the input terminal of the inverter 220, to change from a positive voltage of about four volts to an essentially zero voltage. That inverter will respond to that voltage change to make the voltage at the output terminal thereof, and hence at the lower input terminals of Nor gate 228 and of flip-flop 440, positive; and that Nor gate will respond to that voltage change to make the voltage at the output terminal thereof essentially zero, but that flip-flop will respond to that voltage change to make the voltage at the lower output terminal thereof positive while making the voltage at the upper output terminal thereof essentially zero. The essentially zero voltage at the output terminal of the Nor gate 228 will be applied to the middle input terminal of the Nor gate 254 and to the middle input terminal of the Nor gate in block 422 which corresponds to the Nor gate 254; and those Nor gates will tend to continue to develop positive voltages at the output terminals thereof. The essentially zero voltage at the output terminal of the Nor gate 228 also will be applied to the input of the amplifier 478; and that amplifier will respond to that essentially zero voltage to develop a positive voltage at the output thereof which will energize the relay winding 480, and thus cause that relay winding to move the armature 485 into bridging engagement with the relay contacts 482 and 484. The resulting flow of current through the brake winding 486 of the motor will move the brake of that motor to, and will hold that brake in, rotor-freeing position; and, as a result, the rotor of that motor will be free to rotate.

The positive voltage at the lower output terminal of the flip-flop 440 will be applied to the middle input terminal of the And gate 258, to the middle input terminal of the And gate in block 422 which corresponds to the And gate 258, and to the lower input terminal of the Nor gate 456. That Nor gate will respond to that positive voltage to develop an essentially zero voltag at the output terminal thereof and to apply that essentially zero voltage to the lower input terminal of the And gate 256, to the lower input terminal of the And gate in block 422 which corresponds to the And gate 256, and to the lower input terminal of the Nor gate 252. The essentially zero voltage at the upper output terminal of the flip-flop 440 will be applied to the middle input terminal of the And gate 256, to the middle input terminal of the And gate in block 422 which corresponds to the And gate 256, and to the lower input terminal of the Nor gate 462. That Nor gate will respond to that essentially zero voltage to tend to develop a positive voltage at the output terminal thereof and to apply that positive voltage to the middle input terminal of the Nor gate 252, to the lower input terminal of the And gate 258 and to the lower input terminal of the And gate in block 422 which corresponds to the And gate 258.

The four kilocycle waveform which the multivibrator 235 applies to the upper input terminal of the Nor gate 254 and to the upper input terminal of the Nor gate in the block 422 which corresponds to the Nor gate 254 will make the voltages at those upper input terminals alternately zero and positive four thousand times each second, and thus will tend to make the output terminals of those Nor gates alternately positive and zero four thousand times each second. The negative voltage at the output of the Nor gate 228, and hence at the middle input terminal of the Nor gate 254 and at the middle input terminal of the Nor gate in the block 422 which corresponds to the Nor gate 254, will tend to make the voltages at the output terminals of the latter Nor gates positive. The positive voltage that exists at the collector of the transistor 78, whenever that transistor is non-conductive, will cause the Schmitt trigger 83 to apply a positive voltage to the lower input terminal of the Nor gate 254; and the positive voltage that exists at the collector of the transistor 108, whenever that transistor is non-conductive, will cause the Schmitt trigger in the block 96 which corresponds to the Schmit trigger 83 to apply a positive voltage to the lower input terminal of the Nor gate in block 422 which corresponds to the Nor gate 254. The overall result is that the Nor gate 254 will develop an essentially zero voltage at the output terminal thereof as long as the transistor 78 is non-conductive; and that essentially zero voltage will be applied to the upper input terminals of the And gates 256 and 258 and will inhibit those And gates. Also, the Nor gate in the block 422 which corresponds to the Nor gate 254 will develop an essentially zero voltage at the output terminal thereof as long as the transistor 108 is non-conductive; and that essentially zero voltage will be applied to the upper input terminals of the And gates in the block 422 which corresponds to the And gates 256 and 258 and will inhibit those And gates. Because the And gates 256 and 258 are inhibited, the transistors 260 and 276 will be non-conductive; and hence essentially no current will flow through the primary and secondary windings of the transformers 268 and 284. As a result, the controlled rectifiers 302, 324, 370 and 392 will remain non-conductive; and, because those controlled rectifiers remain non-conductive, the controlled rectifiers 320, 322, 388 and 390 will remain non-conductive. Similarly, because the And gates in the block 422 which corresponds to the And gates 256 and 258 are inhibited, the transistors in the block 422 which correspond to the transistors 260 and 276 will be non-conductive; and hence essentially no current will flow through the primary and secondary windings of the transformers in the block 422 which correspond to the transformers 268 and 284. As a result, the controlled rectifiers in the block 422 which correspond to the controlled rectifiers 302, 324, 370 and 392 will remain non-conductive; and, because those controlled rectifiers remain non-conductive, the controlled rectifiers in the block 422 which correspond to the controlled rectifiers 320, 322, 388 and 390 will remain non-conductive. The overall result is that the rotor of the motor will remain stationary.

At this time, an adjustment should be made in the setting of the adjustable resistor 72 to render the transistor 78 conductive during a limited portion of each half-cycle of the alternating current flowing through the secondary winding 18; and, similarly, an adjustment should be made in the setting of the adjustable resistor 100 to render the transistor 108 conductive during a limited portion of each half-cycle of the alternating current flowing through the secondary winding 22. The movable contact of the adjustable resistor 100 will preferably be "ganged" with the movable contact of the adjustable resistor 72, as indicated by dotted lines in FIG. 1A; and, where that is done, the adjustment of adjustable resistor 72 will automatically and simultaneously adjust the adjustable resistor 100. As the movable contacts of the adjustable resistors 72 and 100 are moved upwardly, the modified sawtooth currents from the integrator 63 and from the integrator in block 96 which corresponds to the integrator 63 will flow, respectively, through the resistors 76 and 106 to ground. The resulting voltage drops across those resistors will add to the voltage drops which the voltage at the junction 194 develops across those resistors to recurrently develop voltages at the bases of transistors 78 and 108 which will render the former transistor conductive at the saturation level during a limited portion of each half-cycle of the alternating current flowing through the secondary winding 18 and which will render the latter transistor conductive at the saturation level during a limited portion of each half-cycle of the alternating current flowing through the secondary winding 22.

As the transistor 78 becomes conductive during a limited portion of each half-cycle of the alternating current flowing through the secondary winding 18, the voltage at the collector of that transistor, and hence at the input of the Schmitt trigger 83, will essentially fall to zero. That Schmitt trigger will respond to the recurrent appearances of essentially zero voltage at the input thereof to apply essentially zero voltage to the lower input terminal of the Nor gate 254 during a limited portion of each half-cycle of the alternating current flowing through the secondary winding. This means that the Nor gate 254 will have zero voltage at the middle input terminal thereof, will have zero voltage at the upper input terminal thereof four thousand times each second, and will have zero voltage at the lower input terminal thereof during a limited portion of each half-cycle of the alternating current flowing through the secondary winding 18; and, as a result, that Nor gate will develop at the output terminal thereof, and also at the upper input terminals of the And gates 256 and 258, short duration, positive-going pulses consisting of four kilocycle waveforms. The And gate 256 will be inhibited by the zero voltages at the middle and lower input terminals thereof; and hence the voltage at the output terminal of that And gate will remain essentially zero. However, because the voltages at the middle and lower input terminals of the And gate 258 are positive, that And gate will respond to the short duration, positive-going pulses consisting of four kilocycle waveforms from the Nor gate 254 to become conductive during a limited portion of each half-cycle of the alternating current flowing through the secondary winding 18. While that And gate is conductive during a limited portion of each half-cycle of the alternating current flowing through the secondary winding 18, it will supply four kilocycle waveforms to the transistor 276; and those waveforms will render that transistor conductive and will cause the transformer 284 to develop corresponding waveforms in the secondary windings 286 and 288 thereof. The resulting voltages across those secondary windings will render the controlled rectifiers 370 and 392 conductive during limited portions of alternate half-cycles of the alternating current flowing through the secondary winding 18; and those controled rectifiers will render the controlled rectifiers 388 and 390 conductive during limited portions of alternate half-cycles of the alternating current flowing through the secondary winding 18. Similarly, as the transistor 108 becomes conductive during a limited portion of each half-cycle of the alternating current flowing through the secondary winding 22, the voltage at the collector of that transistor, and hence at the input of the Schmitt trigger in the block 96 which corresponds to the Schmitt trigger 83, will essentially fall to zero. That Schmitt trigger will respond to the recurrent appearances of essentially zero voltage at the input thereof to apply essentially zero voltage to the lower input terminal of the Nor gate in the block 422 which corresponds to the Nor gate 254 during a limited portion of each half-cycle of the alternating current flowing through the secondary winding 22. This means that the Nor gate in the block 422 which corresponds to the Nor gate 254 will have zero voltage at the middle input trminal thereof, will have zero voltage at the upper input terminal thereof four thousand times each second, and will have zero voltage at the lower input terminal thereof during a limited portion of each half-cycle of the alternating current flowing through the secondary winding 22; and, as a result, that Nor gate will develop at the output terminal thereof, and also at the upper input terminal of the And gates in the block 96 which correspond to the And gates 256 and 258, short duration, positive-going pulses consisting of four kilocycle waveforms. The And gate in the block 422 which corresponds to the And gate 256 will be inhibited by the zero voltages at the middle and lower input terminals thereof; and hence the voltage at the output terminal of that And gate will remain essentially zero. However, because the voltages at the middle and lower input terminals of the And gate in the block 422 which corresponds to the And gate 258 are positive, that And gate will respond to the short duration, positive-going pulses consisting of four kilocycle waveforms from the Nor gate in the block 422 which corresponds to the Nor gate 254 to become conductive during a limited portion of each half-cycle of the alternating current flowing through the secondary winding 22. While that And gate is conductive during a limited portion of each half-cycle of the alternating current flowing through the secondary winding 22, it will supply four kilocycle waveforms to the transistor in the block 422 which corresponds to the transistor 276; and those waveforms will render that transistor conductive and will cause the transformer in the block 422 which corresponds to the transformer 284 to develop corresponding waveforms in the secondary windings in the block 422 which correspond to the secondary windings 286 and 288 thereof. The resulting voltages across those secondary windings will render the controlled rectifiers in the block 422 which correspond to the controlled rectifiers 370 and 392 conductive during limited portions of alternate half-cycles of the alternating current flowing through the secondary winding 22, and those controlled rectifiers will render the controlled rectifiers in the block 422 which correspond to the controlled rectifiers 388 and 390 conductive during limited portions of alternate half-cycles of the alternating current flowing through the secondary winding 22. The movable contacts of the adjustable resistors 72 and 100 will preferably be set to cause the "on" times of the controlled rectifiers 388 and 390, and their counterparts in the block 422, to be just long enough to cause the rotor of the motor to rotate at the rate of just a few revolutions per minute in the counter clockwise direction.

If desired, of course, the setting of the "dead band" of the potentiometer 136 could be made by moving the movable contact 140 of that potentiometer upwardly rather than downwardly. In that event, a positive voltage would be applied to the upper input terminal of the error amplifier 160; and a negative voltage would appear at the upper output terminal of that error amplifier, while a positive voltage would appear at the lower output terminal of that error amplifier. That positive voltage would render the transistor 206 conductive; but, because of the voltage drop across the diode 192, the transistors 78 and 108 would tend to be non-conductive.

The inverter 224 would apply a positive voltage to the upper input terminal of the Nor gate 228 and to the upper input terminal of the flip-flop 440. The voltage at the output terminal of that Nor gate would be essentially zero, and the voltage at the upper output terminal of that flip-flop would become positive while the voltage at the lower output terminal of that flip-flop would be essentially zero. The resulting essentially zero voltage at the middle input terminals of the And gate 258 and of its counterpart in the block 422 would inhibit those And gates. The resulting essentially zero voltage at the lower input terminal of the Nor gate 456 would tend to cause that Nor gate to apply a positive voltage to the lower input terminal of the Nor gate 252 and to the lower input terminals of the And gates 256 and its counterpart in the block 422. The essentially zero voltage at the output terminal of the Nor gate 228 would cause the brake winding 486 to be energized, and thus would free the rotor of the motor to rotate. The essentially zero voltage at the middle input terminals of the Nor gate 254 and of its counterpart in the block 422 would tend to cause those Nor gates to apply positive voltages to the upper input terminals of the And gates 256 and 258 and of their counterparts in the block 422. The four kilocycle waveforms from the multivibrator 235 would make the voltages at the upper input terminals of the Nor gate 254 and of its counterpart in the block 422 alternately zero and positive four thousand times a second; and the output terminals of those Nor gates would thus tend to become alternately positive and zero four thousand times a second. The positive voltages that exist at the collectors of the transistors 78 and 108, whenever those transistors are non-conductive, would cause the Schmitt trigger 83 and its counterpart in the block 96 to apply positive voltages to the lower input terminals of the Nor gate 254 and of its counterpart in the block 422; and those positive voltages would cause those Nor gates to apply inhibiting voltages to the upper input terminals of the And gates 256 and 258 and of their counterparts in the block 422. As long as those And gates were inhibited, substantially no rotative forces would be applied to the rotor of the motor.

The movable contacts of the adjustable resistors 72 and 100 would then be moved far enough upwardly to enable the modified sawtooth currents from the wave-forming and wave-shaping sub-circuits of blocks 94 and 96 to coact with the currents flowing from the diode 192 to render the transistors 78 and 108 conductive for a limited portion of each half-cycle of the alternating current flowing, respectively, through the secondary windings 18 and 22. Thereupon, the Schmitt trigger 83 and its counterpart in the block 96 would apply essentially zero voltage to the lower input terminals, respectively, of the Nor gate 254 and its counterpart in the block 422 during a limited portion of each half-cycle of the alternating current flowing, respectively, through the secondary windings 18 and 22. Those Nor gates would respond to that zero voltage to apply short duration, positive-going pulses consisting of four kilocycle waveforms to the upper input terminals of the And gates 256 and 258 and of their counterparts in the block 422. The And gate 258 and its counterpart in the block 422 would be inhibited by the essentially zero voltage from the lower output terminal of the flip-flop 440; but the And gate 256 and its counterpart in the block 422 would supply four kilocycle waveforms to the transistor 260 and its counterpart in the block 422. Those transistors would become conductive during a limited portion of each half-cycle of the alternating current flowing, respectively, through the secondary windings 18 and 22, and would cause the transformer 268 and its counterpart in the block 422 to develop corresponding waveforms in the secondary windings 270 and 272 and in their counterparts in the block 422. Those waveforms would render the controlled rectifiers 302 and 324 and the counterparts thereof in the block 422 conductive; and, thereupon, the controlled rectifiers 320 and 322 and the counterparts thereof in the block 422 would become conductive. The movable contacts of the adjustable resistors 72 and 100 would preferably be set to cause the "on" times of the controlled rectifiers 320 and 322, and their counterparts in the block 422, to be just long enough to cause the rotor of the motor to rotate at the rate of just a few revolutions per minute in the clockwise direction.

Operation of the control system

To operate the control system of the present invention, the operator will select a desired speed and direction of rotation for the rotor of the motor, and will then appropriately set the movable contact 140 of the potentiometer 136. If that movable contact is moved upwardly beyond the upper limit of the "dead band" of that potentiometer, the rotor of the motor will rotate in the clockwise direction; but if that movable contact is moved downwardly beyond the lower limit of that "dead band," that rotor will rotate in the counterclockwise direction. The extent to which the movable contact 140 of the potentiometer 136 is moved beyond the limits of the "dead band" of that potentiometer will determine the positive voltages developed at the bases of the transistors 78 and 108; and the greater those positive voltages are, the quicker the modified sawtooth currents from the wave-forming and wave-shaping sub-circuits of the blocks 94 and 96 will render the transistors 78 and 108 conductive. When that movable contact is close to the "dead band" of that potentiometer, portions of the modified sawtooth waveforms which are close to the trailing edges of those waveforms will render those transistors conductive; and hence the "on" times of those transistors—and of the appropriate controlled rectifiers—will be short. However, when that movable contact is close to the upper end or lower end of that potentiometer, portions of the modified sawtooth waveforms which are close to the leading edges of those waveforms will render those transistors conductive; and hence the "on" times of those transistors—and of the appropriate controlled rectifiers—will be long. Importantly, because that modified sawtooth waveform is a composite of a cosine waveform and a linear sawtooth waveform, it enables the control system of the present invention to provide stable operation of the motor and to provide linear control of the power supplied to that motor. Specifically, if the movable contact 140 of the potentiometer 136 is set to supply a given voltage to the error amplifier 160 so the control system can supply a predetermined amount of power to the motor, and if that movable contact is then moved to multiply that given voltage by a factor "X," the said predetermined amount of power also will be multiplied by that same factor.

After the operator has set the movable contact 140 of the potentiometer 136 in a position which corresponds to a desired direction and speed of rotation of the rotor of the motor, the error amplifier 160 and one or the other of the diodes 190 and 192 will coact to develop positive voltages at the bases of the transistors 78 and 108; and those positive voltages will enable portions of the modified sawtooth waveforms from the wave-forming and wave-shaping sub-circuits of the blocks 94 and 96 to render those transistors conductive during portions of the half-cycles of the alternating current flowing through the secondary windings 18 and 22. Those transistors will enable the Schmitt trigger 83 and its counterpart in the block 96 to apply essentially zero voltages to the lower input terminals of Nor gate 254 and its counterpart in block 422, and thus enable those Nor gates to pass portions of the four kilocycle waveform from the multivibrator 235 to the upper input terminals of the And gates 256 and 258 and their counterparts in the block 422 during those half-cycles. Those portions of the four kilocycle waveform will act through the appropriate transistors and transformers to render the appropriate controlled rectifiers conductive during those half-cycles. As a result, the rotor of the motor will quickly reach the speed called for by the setting of the movable contact 140 of the potentiometer 136.

If the rotor of the motor slows down, due to an increase in the load, the speed and direction sensing means, which is connected to the resistor 150 by the conductor 152, will decrease the amount of negative feedback that it supplies to the movable contact of the potentiometer 148, and thus to the upper input terminal of the error amplifier 160. That error amplifier will respond to that reduced negative feedback to increase the value of the positive voltage appearing at the junction 194, and will thus lengthen the "on" times of the transistors 78 and 108. This means that the number of four kilocycle waveforms which the Nor gate 254 and its counterpart in the block 422 will cause the appropriate And gates to apply to the firing circuits of the controlled rectifiers will increase. The rotor of the motor will respond to the resulting lengthened "on" times of the appropriate controlled rectifiers to speed up to the value called for by the setting of the movable contact 140 of the potentiometer 136.

If the rotor of the motor speeds up, due to a decrease in the load, the speed and direction sensing means, which is connected to the resistor 150 by the conductor 152, will increase the amount of negative feedback that it supplies to the movable contact of potentiometer 148, and thus to the upper input terminal of error amplifier 160. That error amplifier will respond to that increased negative feedback to reduce the value of the positive voltage appearing at the junction 194, and will thus shorten the "on" times of transistors 78 and 108. This means that the number of four kilocycle waveforms which the Nor gate 254 and its counterpart in the block 422 will cause the appropriate And gates to apply to the firing circuits of the controlled rectifiers will decrease. The rotor of the motor will respond to the resulting shortened "on" times of the appropriate controlled rectifiers to slow down to the value called for by the setting of the movable contact 140 of potentiometer 136. As a result, once the operator of the control system has set the movable contact 140 to call for a desired direction and speed of rotation of the rotor of the motor, that control system will maintain that speed and direction.

The operator can shift the movable contact 140 of potentiometer 136 back into the "dead band" of that potentiometer or can shift that movable contact from a position calling for rotation of the rotor of the motor in one direction to a position calling for rotation of that rotor in the opposite direction. In the former event, the voltage developed at the junction 144 by the speed and direction sensing means will exceed the voltage deceloped at that junction by the potentiometer 136, and will reverse the polarity of the voltage applied to the upper input terminal of the error amplifier 160. In the latter event, the potentiometer 136 will directly reverse the polarity of the voltage applied to that upper input terminal. In both events, the control system will smoothly and quickly decelerate the rotor of the motor; and, in the latter event, that control system will cause that rotor to start rotating in the opposite direction. For purposes of illustration, it will be assumed that the movable contact 140 of potentiometer 136 was above the upper limit of the "dead band" of that potentiometer and was thus calling for clockwise rotation of the rotor of the motor, and that the operator shifted that movable contact downwardly below the lower limit of that "dead band" to call for counter clockwise rotation of that rotor. While that movable contact was calling for clockwise rotation of that rotor, the voltage at the upper output terminal of flip-flop 440, and thus at the lower input terminal of Nor gate 462, was positive, whereas the voltage at the lower output terminal of that flip-flop, and thus at the lower input terminal of Nor gate 456, was essentially zero. As a result, the voltage at the output terminal of Nor gate 456, and hence at the lower input terminal of Nor gate 252 was positive, whereas the voltage at the output terminal of Nor gate 462, and hence at the middle input terminal of Nor gate 252, was essentially zero. The voltage at the upper input terminal of Nor gate 252 was alternately positive and zero as the output of the Schmitt trigger 41 was alternately positive and zero. The overall result was that the voltage at the output terminal of Nor gate 252, and thus at the input of flip-flop 446, was essentially zero. The voltage at the output of that flip-flop, and thus at the input of flip-flop 450, was positive; and the voltage at the output of flip-flop 450, and thus at the input of flip-flop 454, also was positive. This means that the voltage at the upper output terminal of flip-flop 454, and hence at the upper input terminal of Nor gate 456, was essentially zero; whereas the voltage at the lower output terminal of that flip-flop, and hence at the upper input terminal of Nor gate 462, was positive.

When the operator of the control system shifted the movable contact 140 downwardly to call for counter-clockwise rotation of the rotor, the positive voltage at the lower output terminal of the error amplifier 160, and thus at the base of the transistor 206, became negative, whereas the voltage at the upper output terminal of that error amplifier, and thus at the base of the transistor 202, became positive. The transistor 206 thereupon became non-conductive, and the resulting positive voltage at the collector thereof caused the inverter 224 to remove the positive voltage which it had been applying to the upper input terminal of the flip-flop 440; and the transistor 202 became conductive, and the resulting essentially zero voltage at the collector thereof caused the inverter 220 to apply a positive voltage to the lower input terminal of that flip-flop 440. The voltage at the upper output terminal of that flip-flop, and hence at the lower input terminal of Nor gate 462, essentially became zero; whereas the voltage at the lower output terminal of that flip-flop, and hence at the lower input terminal of Nor gate 456, became positive. The flip-flop 454 continued to apply essentially zero voltage to the upper input terminal of Nor gate 456 and continued to apply a positive voltage at the upper input terminal of Nor gate 462. The continued application of a positive voltage at the upper input terminal of Nor gate 462 will keep the voltage at the output of that Nor gate essentially zero, and the application of a positive voltage at the upper input terminal of Nor gate 456 will make the voltage at the output of that Nor gate essentially zero. This means that essentially zero voltages will be applied to the lower input terminals of the And gates 256 and 258 and of their counterparts in the block 422, and that all of those And gates will be inhibited. This is important, because it will keep further firing signals from being transmitted to any of the controlled rectifiers in the blocks 420 and 422.

At the time the voltage at the output terminal of Nor gate 456 falls to zero, both the middle and lower input terminals of Nor gate 252 will have essentially zero voltages applied to them; and when the "off" portion of the next rectangular waveform from the Schmitt trigger 41 is applied to the upper input terminal of the latter Nor gate by the conductor 49, all of the input terminals of that Nor gate will have essentially zero voltages applied to them. Thereupon, that Nor gate will develop a positive voltage at the output thereof and will apply that positive voltage to the input of the flip-flop 446. That flip-flop will respond to that positive voltage to cause the positive voltage at the output terminal thereof to drop to zero; and hence zero voltage will appear at the input terminal of the flip-flop 450. However, that flip-flop requires a positive voltage at the input terminal thereof to change the voltage at the output terminal thereof; and hence the voltage at that output terminal and the voltages at the input and output terminals of the flip-flop 454 will remain unchanged.

During the succeeding "on" portion of the rectangular waveform from the Schmitt trigger 41, the Nor gate 252 will again establish an essentially zero voltage at the output terminal thereof, and thus at the input of the flip-flop 446. However, that zero voltage will not cause the flip-flop 446 to change the voltage at the output thereof; and that voltage, as well as the input and output voltages of the flip-flops 450 and 454, will remain unchanged. The second "off" portion of the rectangular waveform from the Schmitt trigger 41 will again cause the Nor gate 252 to develop a positive voltage at the output thereof, and thus at the input of the flip-flop 446; and that flip-flop will respond to that positive voltage to develop a positive voltage at the output terminal thereof, and thus at the input terminal of the flip-flop 450. The latter flip-flop will respond to that positive voltage to develop an essentially zero voltage at the output terminal thereof, and thus at the input terminal of the flip-flop 454. The flip-flop 454 will not change the voltages at the output terminals thereof in response to the application of an essentially zero voltage to the input terminal thereof; and hence the voltages at those output terminals will remain unchanged.

The succeeding "on" portion of the rectangular waveform from the Schmitt trigger 41 will permit the voltage at the output terminal of the Nor gate 252 to again return to zero; but that voltage will not be able to cause the flip-flop 446 to change the voltage at the output terminal thereof; and hence that output voltage and the input and output voltages of the flip-flops 450 and 454 will remain unchanged. The third "off" period of the rectangular waveform from the Schmitt trigger 41 will again cause the Nor gate 252 to develop a positive voltage at the output terminal thereof, and thus at the input terminal of the flip-flop 446. That flip-flop will respond to that positive voltage to cause the voltage at the output terminal thereof, and hence at the input terminal of flip-flop 450, to fall to zero. The latter flip-flop will not, however, respond to that zero voltage; and hence the output voltage of that flip-flop and the input and output voltages of the flip-flop 454 will remain unchanged.

The next "on" portion of the rectangular waveform from the Schmitt trigger 41 will permit the voltage at the output terminal of the Nor gate 252 to again return to zero, but that voltage will not be able to cause the flip-flop 446 to change the voltage at the output terminal thereof; and hence that output voltage and the input and output voltages of the flip-flops 450 and 454 will remain unchanged. The fourth "off" period of the rectangular waveform from the Schmitt trigger 41 will again cause the Nor gate 252 to develop a positive voltage at the output terminal thereof, and thus at the input terminal of the flip-flop 446. That flip-flop will respond to that positive voltage to develop a positive voltage at the output terminal thereof, and thus at the input terminal of the flip-flop 450. The latter flip-flop will respond to that positive voltage to develop a positive voltage at the output terminal thereof, and thus at the input terminal of the flip-flop 454. The latter flip-flop will respond to that positive voltage to cause the voltage at the lower output terminal thereof to fall to zero and to develop a positive voltage at the upper output terminal thereof. The positive voltage at the upper output terminal of that flip-flop will be applied to the upper input terminal of the Nor gate 456, and it will coact with the positive voltage applied to the lower input terminal of that Nor gate by the flip-flop 440 to continue to keep the output of that Nor gate essentially zero. As a result, the And gate 256 and its counterpart in the block 422 will be inhibited, and they will prevent clockwise rotation of the rotor of the motor. However, the zero voltage at the lower output terminal of the flip-flop 454 will be applied to the upper input terminal of the Nor gate 462, and it will coact with the zero voltage applied to the lower input terminal of that Nor gate by the flip-flop 440 to cause that Nor gate to provide a positive voltage at the output terminal thereof. That positive voltage will be applied to the lower input terminals of the And gate 258 and its counterpart in the block 422; and it will cause those And gates to pass firing signals, and thus cause the rotor of the motor to be driven in the counterclockwise direction.

If the operator of the control system thereafter moves the movable contact 140 of the potentiometer 136 upwardly from the position calling for counter-clockwise rotation of the rotor of the motor to a position calling for clockwise rotation of that rotor, the voltage at the upper output terminal of the flip-flop 440 will again become positive and the voltage at the lower output terminal of that flip-flop will again become essentially zero. While this means that an essentially zero voltage will be applied to the lower input terminal of the Nor gate 456, the flip-flop 454 will be applying a positive voltage to the upper input terminal of that Nor gate and will thus keep the output of that Nor gate essentially zero. The positive voltage at the upper output terminal of the flip-flop 440 will be applied to the lower input terminal of the Nor gate 462 and will cause the voltage at the output terminal of the Nor gate to become essentially zero. At such time, the voltages applied to the lower input terminals of all of the And gates of the control system will be essentially zero, and those And gates will be inhibited and will keep firing signals from reaching the controlled rectifiers of that control system. Subsequently, after four "off" periods of the rectangular waveform from the Schmitt trigger 41 have caused positive voltages to appear at the output terminal of Nor gate 252 four separate times, the delay chain constituted by the flip-flops 446, 450 and 454 will cause the Nor gate 456 to develop a positive voltage at the output terminal thereof—thereby enabling the AND gate 256 and its counterpart in the block 422 to pass firing signals to the appropriate controlled rectifiers of the control system.

These illustrations show that the control system provided by the present invention will keep any and all firing signals from being applied to the controlled rectifiers thereof whenever the direction of rotation of the rotor of the motor is being reversed. Further, these illustrations show that the delay chain constituted by the flip-flops 446, 450 and 454 will keep any and all firing signals from being applied to the controlled rectifiers of the control system throughout a period of time which includes four "off" periods of the rectangular waveform from the Schmitt trigger 41. That period of time can be no shorter than the duration of one and one-half cycles, and can be as long as the duration of two cycles, of the alternating current flowing through the secondary winding 18. Such a period of time is long enough to make sure that all of the controlled rectifiers of the control system will become non-conductive.

Sub-circuit of FIG. 3

FIG. 3 shows a sub-circuit for the control system of FIGS. 1A and 1B which includes And gates 556 and 558 that are identical to the And gates 256 and 258 in FIG. 1B except for the fact that the And gates 556 and 558 have four input terminals whereas the And gates 256 and 258 have only three input terminals. The block 422 in FIG. 1 has And gates that are counterparts of the And gates 556 and 558, and which thus have four input terminals. The upper input terminals of the And gates 556 and 558 are connected to the output terminal of the Nor gate 254; and the upper input terminals of the And gates in the block 422 are connected to the output terminal of the Nor gate in block 422 which corresponds to the Nor gate 254. The second-uppermost input terminals of the And gate 556 and of its counterpart in the block 422 are connected to the conductor 441 by conductors 445 and 442. The second-lowermost input terminals of the And gate 556 and of its counterpart in the block 422 are connected to the output terminal of the Nor gate 456 by conductors 466, 468 and 464. The second-uppermost input terminal of the And gate 558 is directly connected to the conductor 444 and the second-uppermost terminal of the corresponding And gate in the block 422 is connected to that conductor by the conductor 447. The second-lowermost terminals of the And gate 558 and of its counterpart in the block 422 are connected to the output terminal of the Nor gate 462 by conductors 472, 474 and 470.

The numeral 500 denotes a conductor which is connected to the lowermost input terminals of the And gates 556 and 558 and of their counterparts in the block 422; and a Nor gate 502 has the output terminal thereof connected to the conductor 500 by a conductor 504. The lower input terminal of that Nor gate is grounded, and the upper input terminal of that Nor gate is connected to the upper terminal of an adjustable resistor 506 and to the lower terminals of three-parallel-connected thermistors 507, 508 and 509 by a junction 510. A junction 512 connects the upper terminals of those thermistors to a conductor 511 which extends to the junction 133 in FIG. 1A. The thermistors 507, 508 and 509 are thermistors which respond to increases in the temperatures thereof to reduce the resistances thereof. The thermistor 507 will be embedded within or otherwise disposed in heat-exchanging relation with one of the windings of the motor, the thermistor 508 will be embedded within or otherwise disposed in heat-exchanging relation with another of the windings of the motor, and the thermistor 509 will be embedded within or otherwise disposed in heat-exchanging relation with a third winding of the motor. Those thermistors will preferably be "matched" so they will have substantially the same resistances at normal operating temperatures and also will have substantially the same resistances at a temperature corresponding to an objectionable overload of the motor. The adjustable resistor 506 will be preferably set so essentially zero voltage is normally applied to the upper input terminal of the Nor gate 502, but an appreciable positive voltage will be applied to that upper input terminal whenever the temperature of any one of the thermistors 507, 508 and 509 reaches a value indicating the presence of an objectionable overload on one of the windings of the motor.

With essentially zero voltage normally appearing at the upper input terminal of the Nor gate 502, a positive voltage will appear at the output terminal of that Nor gate, and thus at the bottom input terminals of all of the And gates of FIG. 3. This means that as long as the temperatures of all of the windings of the motor are at or below a predetermined level, the conductor 500 will apply enabling signals to the lower input terminals of all of those And gates, and will enable those And gates to pass firing signals to the controlled rectifiers of FIG. 1B. However, in the event the temperature of any one of the windings of the motor were to rise to a level which corresponded to an objectionable overload on that winding, the thermistor in heat-exchanging relation with that winding would experience such a decrease in resistance that the voltage at the junction 510, and hence at the upper input terminal of the Nor gates 502, would become sufficiently positive to cause the voltage at the output terminal of that Nor gate to become essentially zero. Thereupon, the conductor 500 would apply an inhibiting signal to the lower input terminals of all of the And gates of FIG. 3. Subsequently, when that overload disappeared, the sub-circuit of FIG. 3 would again permit the And gates thereof to pass firing signals to the controlled rectifiers of FIG. 1B. In this simple and direct way, the sub-circuit of FIG. 3 will fully protect the motor against injury due to overloads, and yet will permit that motor to resume operation when the overloads have disappeared.

Sub-circuit of FIG. 4

FIG. 4 shows a sub-circuit for the control system of FIGS. 1A and 1B which includes And gates 556 and 558 that are identical to the And gates 256 and 258 in FIG. 1B except for the fact that the And gates 556 and 558 have four input terminals whereas the And gates 256 and 258 have only three input terminals. The block 422 in FIG. 4 has And gates that are counterparts of the And gates 556 and 558, and which thus have four input terminals. The upper input terminals of the And gates 556 and 558 are connected to the output terminal of the Nor gate 254; and the upper input terminals of the And gates in the block 422 are connected to the output terminal of the Nor gate in block 422 which corresponds to the Nor gate 254. The second-uppermost input terminals of the And gate 556 and of its counterpart in the block 422 are connected to the conductor 441 by conductors 445 and 442. The second-lowermost input terminals of the And gate 556 and of its counterpart in the block 422 are connected to the output terminal of the Nor gate 456 by conductors 466, 468 and 464. The second-uppermost input terminal of the And gate 558 is directly connected to the conductor 444, and the second-uppermost terminal of the corresponding And gate in the block 422 is connected to that conductor by the conductor 447. The second-lowermost terminals of the And gate 558 and of its counterpart in the block 422 are connected to the output terminal of the Nor gate 462 by conductors 472, 474 and 470.

The numeral 516 denotes a conductor which is connected to the lower input terminals of the And gates 556 and 558 and of their counterparts in the block 422. Three temperature-sensitive switches 520, 522 and 524 are connected in series with each other and to the output of an inverter 518. The input of that inverter is grounded; and the three series-connected temperature-sensitive switches 520, 522 and 524 are connected to the conductor 516 by a conductor 526. The temperature sensitive switch 520 will be embedded within or otherwise disposed in heat-exchanging relation with one of the windings of the motor, the temperature-sensitive switch 522 will be embedded within or otherwise disposed in a heat-exchanging relation with a second winding of the motor, and the temperature-sensitive switch 524 will be embedded within or otherwise disposed in heat-exchanging relation with a third winding of the motor.

Normally, all of the heat-sensitive switches 520, 522 and 524 will be in "closed" position, and will normally connect the output terminal of the inverter 518 to the conductors 526 and 516, and hence to the lower input terminals of the And gates 556 and 558 and of their counterparts of the block 422. That inverter will have essentially zero voltage at the input thereof, and thus will have a positive voltage at the output thereof; and that positive voltage will constitute an enabling signal for the lower input terminals of all of the And gates of FIG. 4. As a result, those And gates will be able to pass firing signals to the controlled rectifiers of FIG. 1B. However, in the event any of the temperature-sensitive switches 520, 522 and 524 "opened" in response to an overload, the voltages at the input terminals of the And gates of FIG. 4 would become essentially zero; and those voltages would inhibit those And gates. As those And gates became inhibited, they would keep any further firing signals from passing to the controlled rectifiers of FIG. 1B; and thus would re-energize the motor. Subsequently, when that overload disappeared, the subcircuit of FIG. 4 would again permit the And gates thereof to pass firing signals to the controlled rectifiers of FIG. 1B. In this simple and direct way, the sub-circuit of FIG. 4 will fully protect the motor against injury due to overloads, and yet will permit that motor to resume operation when the overloads have disappeared.

If desired, the inverter 518 of FIG. 4 could be eliminated. To eliminate that inverter, it would merely by necessary to apply a source of positive voltage to the right-hand terminal of the temperature-sensitive switch 524.

Conclusion

The signal provided by the movable contact of the potentiometer 136 is an analog-type signal, and the signals from the output terminals of the error amplifier 160 also are analog-type signals; but the signals provided by the transistors 78, 108, 202 and 206, which act as switching transistors, are digital-type signals. Furthermore, the signals provided by the Schmitt trigger 83 and its counterpart in the block 96, the signals from the inverters 220 and 224, the signals from the Nor gate 228, from the Nor gate 254 and its counterpart in the block 422, from the Nor gates 252, 456 and 462, from the flip-flops 440, 446, 450 and 454, and from the And gates 256 and 258 and their counterparts in the block 422 are digital-type signals. This means that most of the signals in the control system provided by the present invention are digital-type signals rather than analog-type signals; and this is desirable, because digital-type signals are substantially insensitive to line voltage variations and to drift. Moreover, digital-type signals can effectively and efficiently operate electrical circuit components, and can be effectively and efficiently generated and acted upon by electrical circuit components, which are relatively inexpensive.

Whenever the transistors 78 and 108, respectively, cause the Schmitt trigger 83 and its counterpart in the block 96 to apply essentially zero voltage to the lower input terminals of the Nor gate 254 and of its counterpart in the block 422, a series of cycles of the four kilocycle waveform from the multivibrator 235 will be supplied to the transistor 260 and its counterpart in the block 422 or to the transistor 276 and its counterpart in the block 422. The appropriate transistor and its counterpart will cause the transformer 268 and its counterpart in the block 422 or the transformer 284 and its counterpart in the block 422 to apply that series of cycles of the four kilocycle waveform to the secondary windings thereof to render the appropriate controlled rectifiers of the group of controlled rectifiers 302, 324, 370 and 392 and their counterparts in the block 422 conductive. The application of a series of kilocycle range waveforms to those controlled rectifiers is important, because if any one of those controlled rectifiers failed to become conductive as the first cycle of the series of cycles of the four kilocycle waveforms was applied to the gate-to-cathode circuit thereof, that controlled rectifier would receive a further firing pulse within one quarter of a millisecond thereafter. Consequently, the control system provided by the present invention is able to supply the desired amount of power to the motor even if any one of the controlled rectifiers thereof fails to "fire" every time it receives a firing signal.

The embodiment of control system shown by FIGS. 1A and 1B is intended to control the speed and direction of a three phase alternating current motor. That control system could readily be adapted to control the speed of a universal type, single phase motor by eliminating the blocks 96 and 422, by eliminating the secondary winding 22, by eliminating the fuse 98, by eliminating the conductors 49, 99, 109, 112, 222, 226, 230, 292, 418, 424, 426, 428, 429, 430, 434, 436, 441, 442, 443, 444, 445, 447, 452, 464, 466, 468, 470, 472, and 474, by eliminating the adjustable resistor 100, by eliminating the resistors 101, 106, 169, 182, 188, 198, 200, 204, 214, 218, 278, 280, 372, 374, 376, 378, 394, 396, 398, 400 and 416, by eliminating the diodes 192, 290, 386 and 408, by eliminating the capacitors 186, 208, 210, 382, 384, 404, 406 and 414, by eliminating the controlled rectifiers 370, 388, 390 and 392, by eliminating the transistors 108, 202, 206 and 276, by eliminating the inverters 220 and 224, by eliminating the flip-flop 440, by eliminating the binaries 446, 450 and 454, by eliminating the transformers 284 and 360, by eliminating the choke 415, by eliminating the Zener diodes 380 and 402, by eliminating the And gate 258, by eliminating the Nor gates 228, 252, 254, 456 and 462, and by connecting the conductors 92 and 250 to two of the input terminals of And gate 256. In such event, the error amplifier 160 could be replaced by a single output amplifier that provided a positive-going output.

The control system provided by the present invention is usable with three phase motors of different horsepower ratings. All that need be done to adapt that control system for larger horsepower three phase motors is to replace the controlled rectifiers 320, 322, 388 and 390 and their counterparts in the block 422 with larger current-carrying capacity controlled rectifiers.

The control system provided by the present invention can be operated by alternating currents having frequencies as low as fifty cycles per second and as high as four hundred cycles per second. Where frequencies in the range of four hundred cycles per second are used to operate that control system, the values of the resistors 56 and 91, and of their counterparts in the block 96, and the values of the capacitors 68 and 89, and of their counterparts in the block 96, should be changed to enable the wave-forming wave-shaping sub-circuits of the blocks 94 and 96 to provide modified sawtooth waveforms of the type shown by FIG. 2. Also where the control system is to be operated by alternating current having a frequency closed to four hundred cycles per second, the frequency of the multivibrator 235 should be increased by one or more kilocycles per second.

The control system provided by the present invention enables the motor to which it is connected to maintain a constant torque for a constant load at any desired speed or direction of rotation. With the said one preferred embodiment of control system provided by the present invention, a three phase alternating current motor provided substantially constant torque for a constant load at a number of selected speeds over a range of from less than fifteen revolutions per minute to full speed. A substantially infinite number of speeds can be selected selected throughout such a range; and the control system will enable the motor to apply a constant torque to the load at any of those selected speeds.

The multivibrator 235 is desirable because it supplies many pulses during each half-cycle of the alternating current supplied to the secondary winding 18 or to the secondary winding 22; and hence it will enable any of the controlled rectifiers to "fire" promptly even if it fails to "fire" at the instant the first "firing" pulse is applied to the gate-to-cathode circuit thereof. That multivibrator also is desirable because it provides fast-rising pulses; and such pulses assure prompt "firing" of the controlled rectifiers to which they are applied. However, if desired, a unijunction transistor or a pulse transformer could be used in lieu of that multivibrator.

If a very inexpensive control system was needed, and if occasional "mis-fires" of the controlled rectifiers could be tolerated, the multivibrator 235 could be eliminated; and the sharp changes in the conductive states of the transistors 260 and 276, and of their counterparts in the block 422, could be relied upon to provide the firing pulses for the controlled rectifiers 302, 324, 370 and 392, and of their counterparts in the block 422.

The conductor 152 has been described as being connected to a speed and direction-sensing means. That conductor could, if desired, be connected to a position-sensing means, or to a sensing means which was responsive to temperature, pressure or other condition. In addition, where desired, that conductor could be connected to a combination of a speed and direction-sensing means and of some other sensing means.

It will be noted that the control system provided by the present invention develops a D.C. command signal and also develops a D.C. control signal in response to a sensing means. Furthermore, that control system sums those D.C. signals and applies that sum to an integrated differential amplifier. By utilizing D.C. summing of those command and control signals, the control system provided by the present invention obviates the phase-shifting errors which frequently are encountered in A.C. summing systems. By utilizing an integrated differential amplifier, the termperature of all of the components of that differential amplifier are kept substantially the same; and hence there will be substantially no drift. Because there will be substantially no drift, that differential amplifier can be used to develop two, single-ended, output signals relative to ground. By having two, single-ended output signals relative to ground, the control system provided by the present invention can use switching transistors that have grounded emitters; and this is desirable, because it avoids the common-mode problems which can occur where switching transistors are used which do not have the emitters thereof grounded.

The use of the And gates 256 and 258, and of their counterparts in the block 422, is desirable because it enables small amounts of control power to control the large amounts of power which must be supplied to the motor. As indicated particularly by FIGS. 3 and 4, the And gates 556 and 558, and their counterparts in the block 422, enable thermistors or heat-sensitive switches embedded within the windings of the motor to halt the supplying of power to that motor whenever any of those windings attains a predetermined temperature. By increasing the number of input terminals of the And gates 256 and 258, and of their counterparts in the block 422, any desired number of controls could be incorporated into the control system to halt any further supplying of power to the motor, in the event a predetermined condition or quality was not maintained.

The delay chain which includes the binaries 446, 450 and 454 could have additional binaries added to it to enable it to provide a longer delay before power can be re-applied to the motor. However, the delay provided by that delay chain has been found to be adequate. That delay chain is desirable because it is locked to the frequency of the applied alternating current, and hence the regulation of that delay chain is as good as the frequency of that alternating current. That delay chain also is desirable because it obviates all need of a current-sensing transformer.

It will be noted that the control system provided by the present invention senses changes in direction of the rotor of the motor by sensing changes in the polarity of the signal applied to the input terminal of the error amplifier 160. The sensing of changes in direction of rotation by the sensing of changes in polarity is desirable because it avoids all need of a phase detector, and thus avoids the non-linearity which can arise from the use of such a detector.

The control system provided by the present invention does not require any tuned circuits, and hence it avoids the errors which can arise from the use of such circuits. Further, by avoiding the use of tuned circuits, that control system avoids the bulk and cost which would be involved in the use of tuned circuits which had to operate at the frequency of the alternating current supplied to that control system.

Whereas the drawing and accompanying description have shown and described a preferred embodiment of the present invention, it should be apparent to those skilled in the art that various changes may be made in the form of the invention without affecting the scope thereof.

What I claim is:

1. A static control system for an alternating current motor which comprises:
   a selectively-conductive control element connectable between said motor and a source of alternating current,
   firing means for said selectively-conductive control element,
   a source of D.C. command signals,
   means connected to a sensing element to provide a D.C. control signal,
   means for combining said D.C. command signal and said D.C. control signal to develop an analog-type D.C. signal,
   a selectively-conductive member that receives said analog-type D.C. signal and that responds to said analog-type D.C. signal to change state and thereby develop a digital signal, and
   gating means that selectively inhibits or enables said firing means for said selectively-conductive control element,
   said gating means being connected to said selectively-conductive member to receive said digital signal,
   said digital signal being adapted during half-cycles of the alternating current applied to said selectively-conductive control element to cause said gating means to enable said firing means and thereby cause said selectively-conductive control element to supply A.C. power to said motor.

2. A static control system for an alternating current motor as claimed in claim 1 wherein an integrated amplifier connects said analog-type D.C. signal to said selectively-conductive member, said integrated amplifier having all components thereof at substantially the same temperature to virtually eliminate all drift.

3. A static control system for an alternating current motor as claimed in claim 1 wherein a switching member can respond to said analog-type D.C. signal to cause said motor to rotate in one direction, a second switching member can respond to said analog-type D.C. signal to cause said motor to rotate in the opposite direction, and a differential amplifier connects said analog-type D.C. signal to said switching member, said differential amplifier providing two single-ended, output signals relative to ground.

4. A static control system for an alternating current motor as claimed in claim 1 wherein a second selectively-conductive control element is connectable between said motor and said source of alternating current, a second firing means selectively supplies firing signals to said second selectively-conductive control element, a second selectively-conductive member receives said analog-type D.C. signal and selectively responds to said analog-type D.C. signal to change state and thereby develop a second digital signal, a second gating means selectively inhibits or enables said second firing means for said second selectively-conductive control element, said second gating means being connected to said second selectively-conductive member to receive said second digital signal, said second digital signal being adapted during half-cycles of the alternating current applied to said second selectively-conductive control element to cause said second gating means to enable said second firing means and thereby cause said second selectively-conductive control element to supply A.C. power to said motor, and a switching member can respond to said analog-type D.C. signal to cause said motor to rotate in one direction, a second switching member can respond to said analog-type D.C. signal to cause said motor to rotate in the opposite direction, and a differential amplifier connects said analog-type D.C. signal to the first said and said second switching members, the first said switching member responding to said analog-type D.C. signal, whenever said analog-type D.C. signal is positive, to change state and coact with the first said gating means and the first said selectively-conductive control element to drive said motor in said one direction, said second switching member responding to said analog-type D.C. signal, whenever said analog-type D.C. signal is negative, to change state and coact with said second gating means and said second selectively-conductive control element to drive said motor in said opposite direction.

5. A static control system for an alternating current motor as claimed in claim 1 wherein a switching member selectively develops a switching digital signal and applies said switching digital signal to said gating means, said gating means responding to the first said digital signal and to said switching digital signal to enable said firing means and thereby cause said selectively-conductive control element to supply A.C. power to said motor, said gating means not responding to just the first said digital signal or said switching digital signal to enable said firing means and thereby cause said selectively-conductive control element to supply A.C. power to said motor.

6. A static control system for an alternating current motor as claimed in claim 1 wherein a switching member selectively develops a switching digital signal and applies said switching digital signal to said gating means, said gating means responding to the first said digital signal and to said switching digital signal to enable said firing means and thereby cause said selectively-conductive control element to supply A.C. power to said motor, said gating means not responding to just the first said digital signal or said switching digital signal to enable said firing means and thereby cause said selectively-conductive control element to supply A.C. power to said motor, and rectifying means to rectify said analog-type D.C. signal and to apply a rectified analog-type D.C. signal to said selectively conductive member, said switching member responding only to analog-type D.C. signals of a predetermined polarity, said rectifying means enabling said selectively-conductive member to respond to analog-type D.C. signals of either polarity.

7. A static control system for an alternating current motor as claimed in claim 1 wherein a switching member selectively develops a switching digital signal and applies said switching digital signal to said gating means, said gating means responding to the first said digital signal and to said switching digital signal to enable said firing means and thereby cause said selectively-conductive control element to supply A.C. power to said motor, said gating means not responding to just the first said digital signal or said switching digital signal to enable said firing means and thereby cause said selectively-conductive control element to supply A.C. power to said motor, a second selectively-conductive member, said switching member between said motor and said source of alternating current, a second firing means that selectively supplies firing signals to said second selectively-conductive control element, a second selectively-conductive member that receives said analog-type D.C. signal and selectively responds to said analog-type D.C. signal to change state and thereby develop a second digital signal, a second gating means selectively inhibits or enables said second firing means for said second selectively-conductive control element, said second gating means being connected to said second selectively-conductive member to receive said second digital signal, said second digital signal being adapted during half-cycles of the alternating current applied to said second selectively-conductive control element to cause said second gating means to enable said second firing means and thereby cause said second selectively-conductive control element to supply A.C. power to said motor, and rectifying means to rectify said analog-type D.C. signal and to apply a rectified analog-type D.C. signal to the first said and said second selectively-conductive members, the first said switching member responding only to analog-type D.C. signals of a predetermined polarity and said second switching member responding only to analog-type D.C. signals of the opposite polarity, said rectifying means enabling the first said and said second selectively-conductive members to respond to analog-type D.C. signals of either polarity.

8. A static control system for an alternating current motor as claimed in claim 1 wherein a second selectively-conductive control element is connectable between said motor and said source of alternating current, a second firing means selectively supplies firing signals to said second selectively-conductive control element, a second selectively-conductive member receives said analog-type D.C. signal and selectively responds to said analog-type D.C. signal to change state and thereby develop a second digital signal, a second gating means selectively inhibits or enables said second firing means for said second selectively-conductive control element, said second gating means being connected to said second selectively-conductive member to receive said second digital signal, said second digital signal being adapted during half-cycles of the alternating current applied to said second selectively-conductive control element to cause said second gating means to enable said second firing means and thereby cause said second selectively-conductive control element to supply A.C. power to said motor, the first said switching member responding to said analog-type D.C. signal, whenever said analog-type D.C. signal is positive, to change state and coact with the first said gating means and the first said selectively-conductive control element to drive said motor in said one direction, said second switching member responding to said analog-type D.C. signal, whenever said analog-type D.C. signal is negative, to change state and coact with said second gating means and said second selectively-conductive control element to drive said motor in said opposite direction, and a delay chain which coacts with the first said and said second gating means to inhibit the first said and said second firing means, and thus keep the first said and said second selectively-conductive control elements from supplying A.C. power to said motor, for a predetermined period of time after each change in direction of rotation of said motor.

9. A static control system for an alternating current motor as claimed in claim 1 wherein a second selectively-conductive control element is connectable between said motor and said source of alternating current, a second firing means selectively supplies firing signals to said second selectively-conductive control element, a second selectively-conductive member receives said analog-type D.C. signal and selectively responds to said analog-type D.C. signal to change state and thereby develop a second digital signal, a second gating means selectively inhibits or enables said second firing means for said second selectively-conductive control element, said second gating means being connected to said second selectively-conductive member to receive said second digital signal, said second digital signal being adapted during half-cycles of the alternating current applied to said second selectively-conductive control element to cause said second gating means to enable said second firing means and thereby cause said second selectively-conductive control element to supply A.C. power to said motor, the first said switching member responding to said analog-type D.C. signal, whenever said analog-type D.C. signal is positive, to change state and coact with the first said gating means and the first said selectively-conductive control element to drive said motor in said one direction, said second switching member responding to said analog-type D.C. signal, whenever said analog-type D.C. signal is negative, to change state and coact with said second gating means and said second selectively-conductive control element to drive said motor in said opposite direction, and a delay chain which coacts with the first said and said second gating means to inhibit the first said and said second firing means, and thus keep the first said and said second selectively-conductive control elements from supplying A.C. power to said motor, for a predetermined period of time after each change in direction of rotation of said motor, said delay chain having a plurality of binaries therein, whereby said delay chain responds to and develops digital signals, and means locking said delay chain to the frequency of said alternating current, whereby the regulation of said delay chain is as good as the frequency of said alternating current.

10. A static control system for an alternating current motor as claimed in claim 1 wherein a temperature-sensing element is in heat-exchanging relation with said motor, said temperature-sensing element and said gating means inhibiting said firing means for said selectively-conductive control element, and thereby keeping said selectively-conductive control element from suppling A.C. power to said motor, whenever said temperature-sensing element senses a predetermined temperature.

11. A static control system for an alternating current motor as claimed in claim 1 wherein said motor is a plural-phase motor, wherein a temperature-sensing element is in heat-exchanging relation with a winding of said motor, and wherein a second temperature-sensing element is in heat-exchanging relation with a second winding of said motor, the first said temperature-sensing element and said gating means inhibiting said firing means for said selectively-conductive control element and thereby keeping said selectively-conductive control element from supplying A.C. power to said motor whenever the first said temperature-sensing element senses a predetermined temperature, said second temperature-sensing element and said gating means inhibiting said firing means for said selectively-conductive control element, and thereby keeping said selectively-conductive control element from supplying A.C. power to said motor whenever said second temperature-sensing element senses a second predetermined temperature.

12. A static control system for an alternating current motor as claimed in claim 1 wherein a condition-sensing element and said gating means inhibit said firing means for said selectively-conductive control element, whenever said condition-sensing means senses a predetermined condition.

13. A static control system for an alternating current motor as claimed in claim 1 wherein a source of relatively high frequency signals is connected to said gating means, said gating means selectively supplying said relatively high frequency signals to and selectively isolating said relatively high frequency signals from said firing means for said selectively-conductive control element, and thereby selectively causing said selectively-conductive control element to supply A.C. power to said motor or keeping said selectively-conductive control element from supplying A.C. power to said motor.

14. A static control system for an alternating current motor as claimed in claim 1 wherein a source of relatively high frequency signals is connected to said gating means, said gating means selectively supplying said relatively high frequency signals to and selectively isolating said relatively high frequency signals from said firing means for said selectively-conductive control element, and thereby selectively causing said selectively-conductive control element to supply A.C. power to said motor or keeping said selectively-conductive control element from supplying A.C. power to said motor, said source of relatively high frequency signals being a free-running multivibrator that provides a plurality of fast-rising "firing" pulses for said selectively-conductive control element during each half-cycle of said alternating current.

15. A static control system for an alternating current motor as claimed in claim 1 wherein a wave-shaping sub-circuit applies an input signal to said selectively-conductive member which will coact with said analog-type D.C. signal to enable said control system to provide linear control of the power supplied to said motor by said selectively-conductive control element.

16. A static control system for an alternating current motor as claimed in claim 1 wherein a wave-shaping sub-circuit applies an input signal to said selectively-conductive member which will coact with said analog-type D.C. signal to enable said control system to provide linear control of the power supplied to said motor by said selectively-conductive control element, said wave-shaping sub-circuit combining a sawtooth signal with a rectified A.C. signal to provide a cosine-modified sawtooth signal.

17. A static control system for an alternating current motor as claimed in claim 1 wherein a second selectively-conductive member receives said analog-type D.C. signal and responds to said analog-type D.C. signal to change state and thereby develop a second digital signal, and a differential amplifier connects said analog-type D.C. signal to both the first said and said second selectively-conductive members, said differential amplifier providing two single-ended, output signals relative to ground, whereby said selectively-conductive members can be switching transistors which have the emitters thereof grounded.

18. A static control system for an alternating current motor which comprises:
 a selectively-conductive control element connectable between said motor and a source of alternating current,
 firing means for said selectively-conductive control element,
 a second selectively-conductive control element connectable between said motor and said source of alternating current,
 second firing means for said second selectively-conductive control element,
 means responsive to the direction of rotation of the rotor of said motor,
 gating means to enable or inhibit the first said and said second firing means, and
 a delay means connected between said direction-sensing means and said gating means to inhibit said gating means and thereby keep the first said and said second firing means from firing the first said or said second selectively-conductive control element for a predetermined length of time after said rotor of said motor changes direction.

19. A static control system for an alternating current motor as claimed in claim 18 wherein said delay means includes a plurality of binaries connected in a counting chain, said counting chain counting a predetermied number of half-cycles of said alternating current.

20. A static control system for an alternating current motor which comprises:
 a selectively-conductive control element connectable between said motor and a source of alternating current,
 firing means for said selectively-conductive control element,
 a selectively-conductive member that can actuate said firing means and thereby cause said firing means to render said selectively-conductive control element conductive,
 a source of D.C. signals for said selectively-conductive member, and
 a wave-shaping sub-circuit that provides a signal which coacts with said D.C. signals from said source of D.C. signals to selectively render said selectively-conductive member conductive.

21. A static control system for an alternating current motor as claimed in claim 20 wherein said D.C. signals from said source of D.C. signals are analog-type D.C. signals, and wherein said wave-shaping sub-circuit applies a signal to said selectively-conductive member which coacts with said analog-type D.C. signals to enable said control system to provide linear control of the power supplied to said motor by said selectively-conductive control element.

22. A static control system for an alternating current motor as claimed in claim 20 wherein said wave-shaping sub-circuit combines a sawtooth signal with a rectified A.C. signal to provide a cosine-modified sawtooth signal.

23. A static control system for an alternating current motor as claimed in claim 20 wherein said wave-shaping sub-circuit includes an integrator which tends to form a sawtooth waveform, includes a rectifier which is connected to said source of alternating current to provide rectified A.C., and includes means to couple said rectified A.C. to said sawtooth waveform.

24. A static control system for an alternating current motor as claimed in claim 20 wherein said wave-shaping sub-circuit combines a sawtooth signal with a rectified A.C. signal to provide a cosine-modified sawtooth signal, wherein said D.C. signals from said source of D.C. signals are analog-type D.C. signals, and wherein said analog-type D.C. signals are variable in amplitude to enable different portions of said cosine-modified sawtooth waveform signal to trigger said selectively-conductive member.

25. A static control system for an alternating current motor which comprises:
 a selectively-conductive control element connectable between said motor and a source of alternating current,
 firing means for said selectively-conductive control element,
 a source of relatively high frequency signals capable of firing said firing means and thereby enabling said firing means to render said selectively-conductive control element conductive,
 gating means connected between said source of relatively high frequency signals and said firing means to selectively pass the relatively-high frequency signals from said source of relatively high frequency signals or to block the passage to said relatively high frequency signals, and
 control means to selectively open and close said gate and thereby determine the lengths of time, during half-cycles of said alternating current, during which said relatively high frequency signals from said source of relatively high frequency signals can actuate said firing means,
 said source of relatively high frequency signals providing a plurality of relatively high frequency signals during each half-cycle of said alternating current, whereby said selectively-conductive control element has an opportunity to become conductive during said half-cycles of said alternating current even if said selectively-conductive control element does not respond to the first firing signal from said firing means during a given half-cycle of said alternating current.

26. A static control system for an alternating current motor which comprises:
  a selectively-conductive control element connectable between said motor and a source of alternating current,
  firing means for said selectively-conductive control element, a second selectively-conductive control element connectable between said motor and said source of alternating current,
  second firing means for said second selectively-conductive control element,
  a selectively-conductive member which can respond to an analog-type D.C. signal to develop a digital signal,
  a second selectively-conductive member that can respond to an analog-type D.C. signal to develop a second digital signal,
  a source of analog-type D.C. signals, and
  a differential amplifier connected to said source of analog-type D.C. signal that can provide two, single-ended, output signals relative to ground,
  said two, single-ended, output signals relative to ground enabling said selectively-conductive members to be switching transistors which have the emitters thereof grounded.

References Cited
UNITED STATES PATENTS

| | | | |
|---|---|---|---|
| 3,317,805 | 5/1967 | Kay et al. | 318—231 |
| 3,365,638 | 1/1968 | Risberg | 318—227 XR |

ORIS L. RADER, *Primary Examiner.*

G. Z. RUBINSON, *Assistant Examiner.*

U.S. Cl. X.R.

318—227, 230, 231